(12) United States Patent
Farazmandnia et al.

(10) Patent No.: US 7,079,865 B1
(45) Date of Patent: Jul. 18, 2006

(54) APPARATUS AND METHOD FOR CONNECTING A CELLULAR TELEPHONE TO A UNIVERSAL SERIAL BUS

(75) Inventors: Farshid Farazmandnia, Laguna Niguel, CA (US); George C. Sneed, Irvine, CA (US); Michael O. Chandler, Newport Beach, CA (US)

(73) Assignee: Skyworks Solutions, Inc., Irvine, CA (US)

( * ) Notice: Subject to any disclaimer, the term of this patent is extended or adjusted under 35 U.S.C. 154(b) by 141 days.

(21) Appl. No.: 10/666,617

(22) Filed: Sep. 17, 2003

Related U.S. Application Data

(63) Continuation of application No. 09/312,064, filed on May 13, 1999, now Pat. No. 6,625,472.

(51) Int. Cl.
*H04B 1/38* (2006.01)

(52) U.S. Cl. .................... 455/557; 455/559; 455/550.1; 455/556.1

(58) Field of Classification Search ................ 455/559, 455/550, 557, 550.1; 370/328, 480; 713/200, 713/174; 320/115
See application file for complete search history.

(56) References Cited

U.S. PATENT DOCUMENTS

| | | | |
|---|---|---|---|
| 5,367,563 A | 11/1994 | Sainton | |
| 5,864,710 A | 1/1999 | Sands et al. | |
| 6,167,061 A * | 12/2000 | Nakatsugawa | 370/480 |
| 6,211,649 B1 * | 4/2001 | Matsuda | 320/115 |
| 6,370,603 B1 | 4/2002 | Silverman et al. | |
| 6,529,743 B1 * | 3/2003 | Thompson et al. | 455/557 |
| 6,574,734 B1 * | 6/2003 | Colson et al. | 726/21 |
| 6,873,608 B1 * | 3/2005 | Plotnik et al. | 370/328 |
| 2004/0063464 A1 * | 4/2004 | Akram et al. | 455/559 |

* cited by examiner

*Primary Examiner*—Sonny Trinh
*Assistant Examiner*—Phuoc Doan
(74) *Attorney, Agent, or Firm*—Farjami & Farjami LLP

(57) ABSTRACT

A mobile phone interface (MPI) is molded between the ends of a Universal Serial Bus (USB) cable. One end of the USB cable is plugged into a standard USB port on a personal computing device and the other end is plugged into a cellular telephone. The MPI comprises a USB serial interface engine (USB SIE), a digital translation block (DTB) and a cellular phone interface. The cellular phone interface provides electrical connections to the signals within the supported cellular telephone. The DTB performs synchronous and asynchronous data transfers and buffer functions in accordance with the implemented protocol. The USB serial interface engine performs serialization, de-serialization and USB set-up in accordance with USB standards. Software for controlling the MPI is installed on the computer system. The control software comprises a communication control stack, a hardware access driver and an external plug-in module.

17 Claims, 16 Drawing Sheets

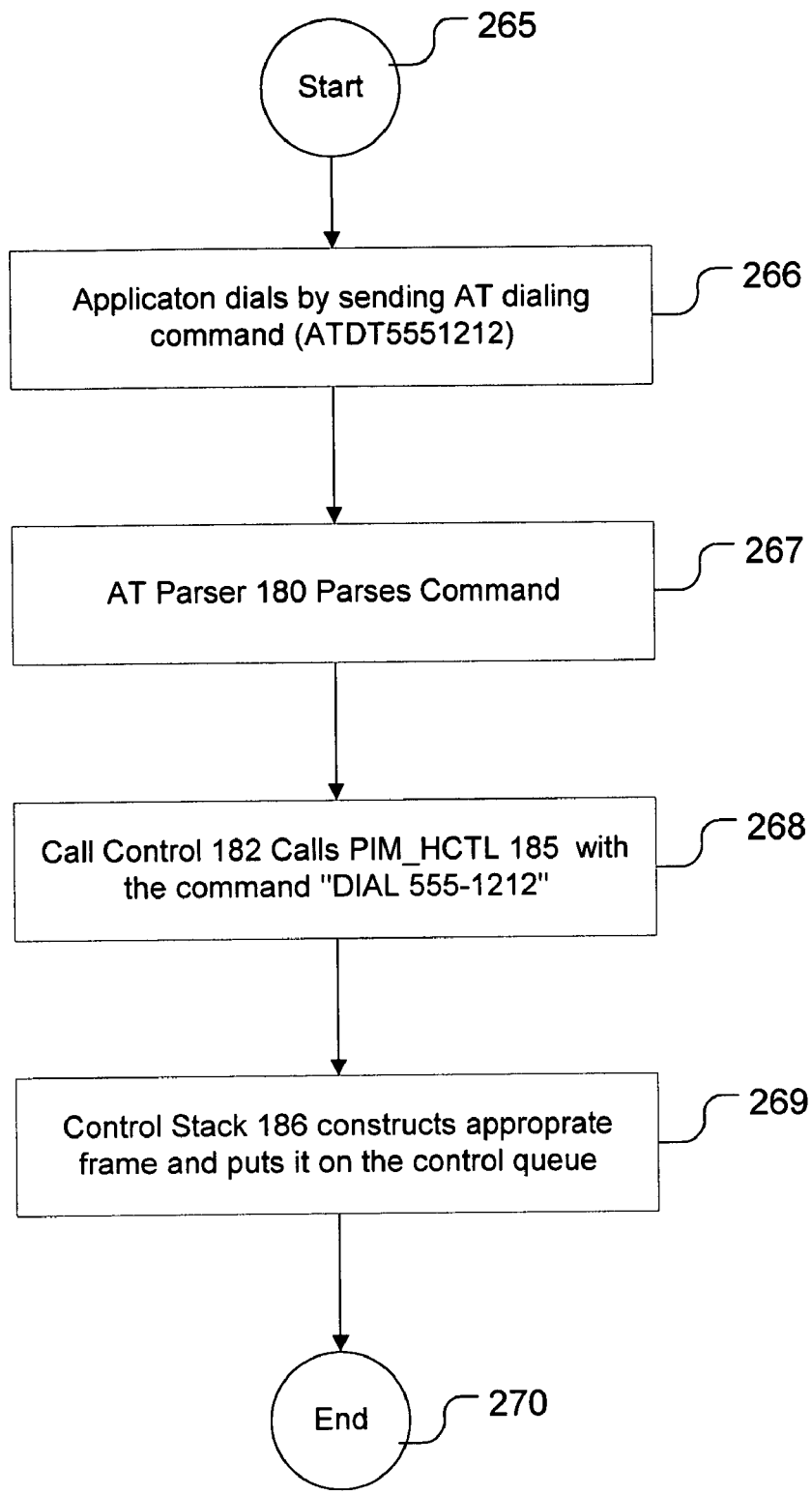
Fig. 13A Control Flow High Level

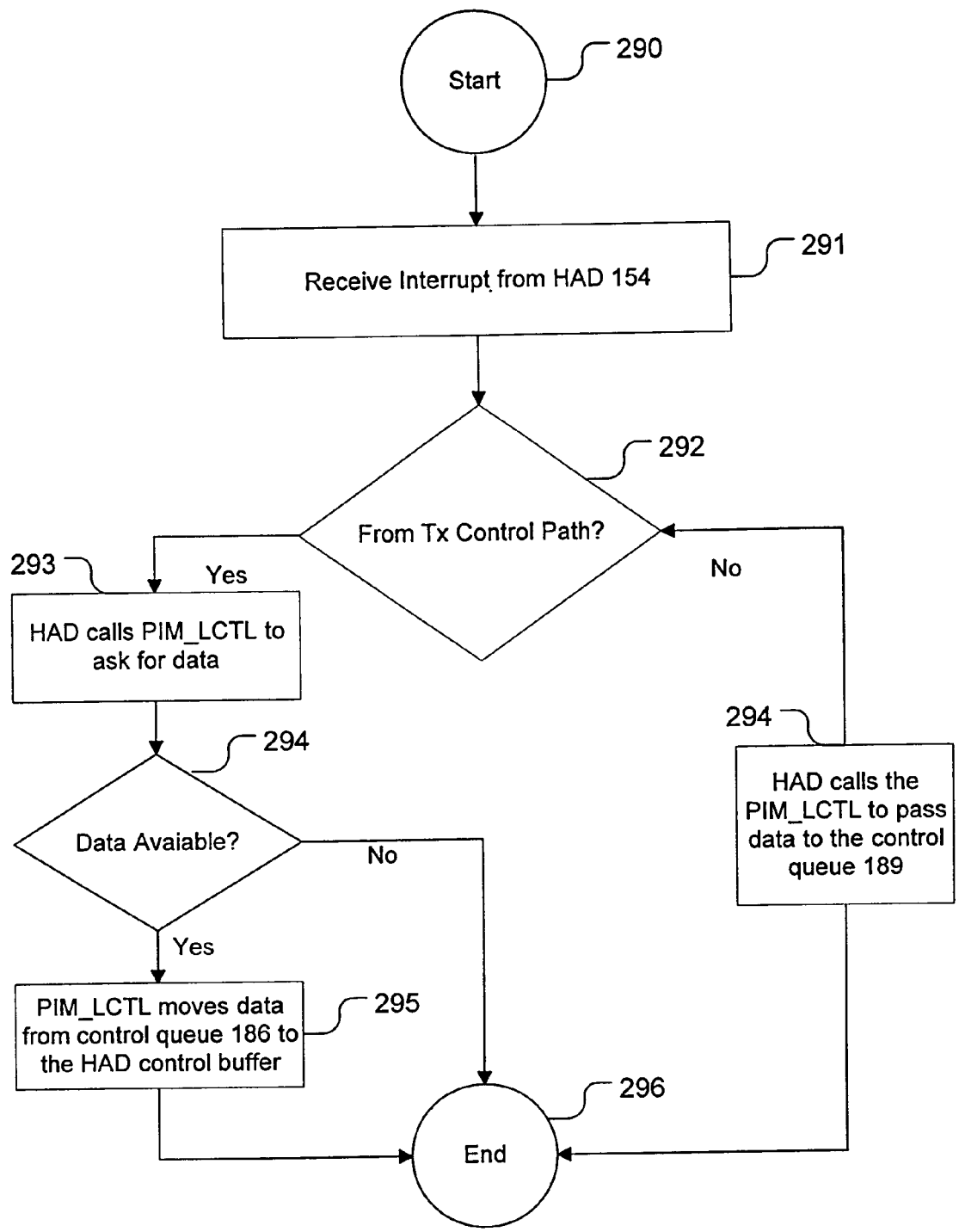
Fig. 13B  Control Flow Low Level

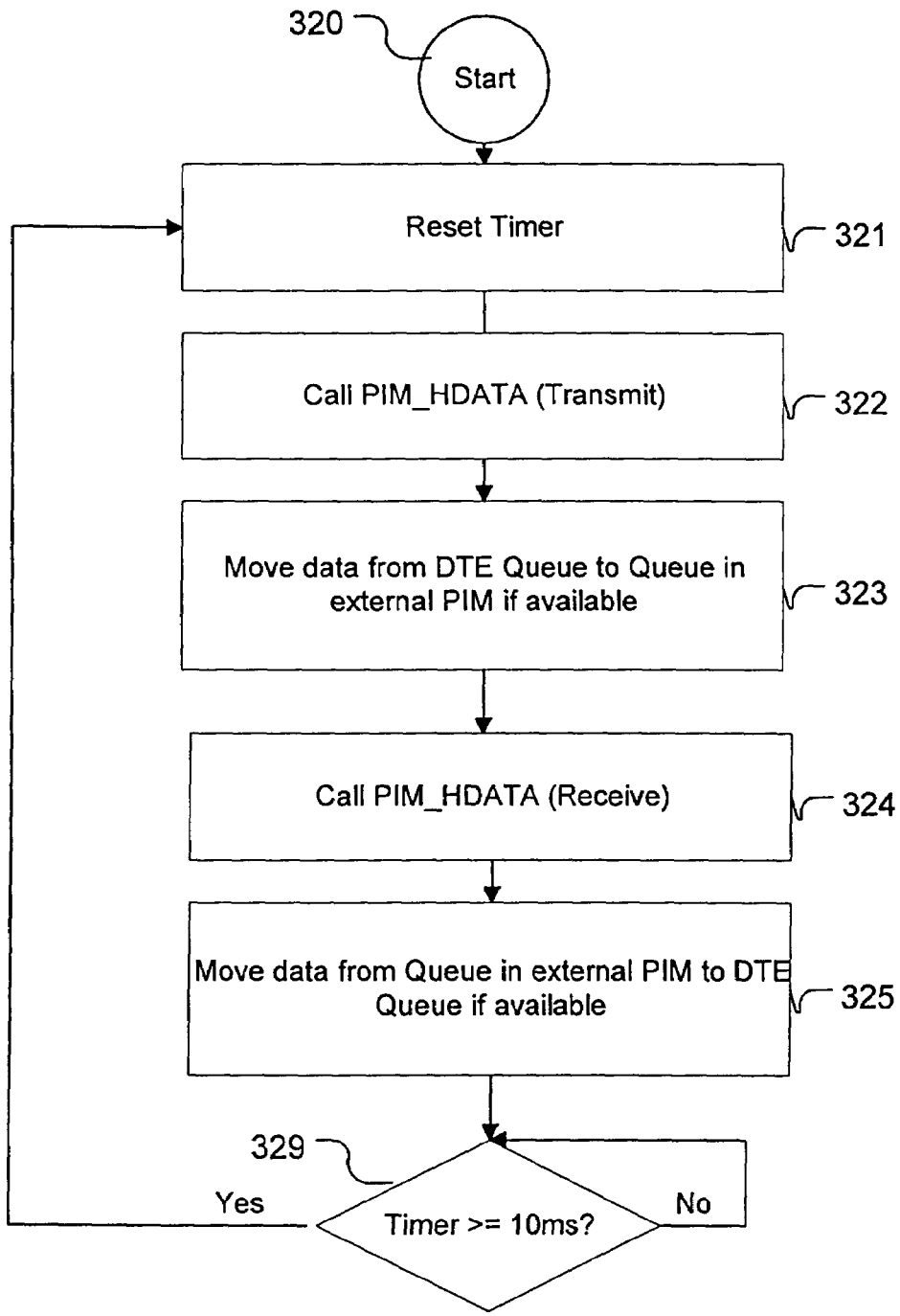
FIG. 14A  Data Flow High Level

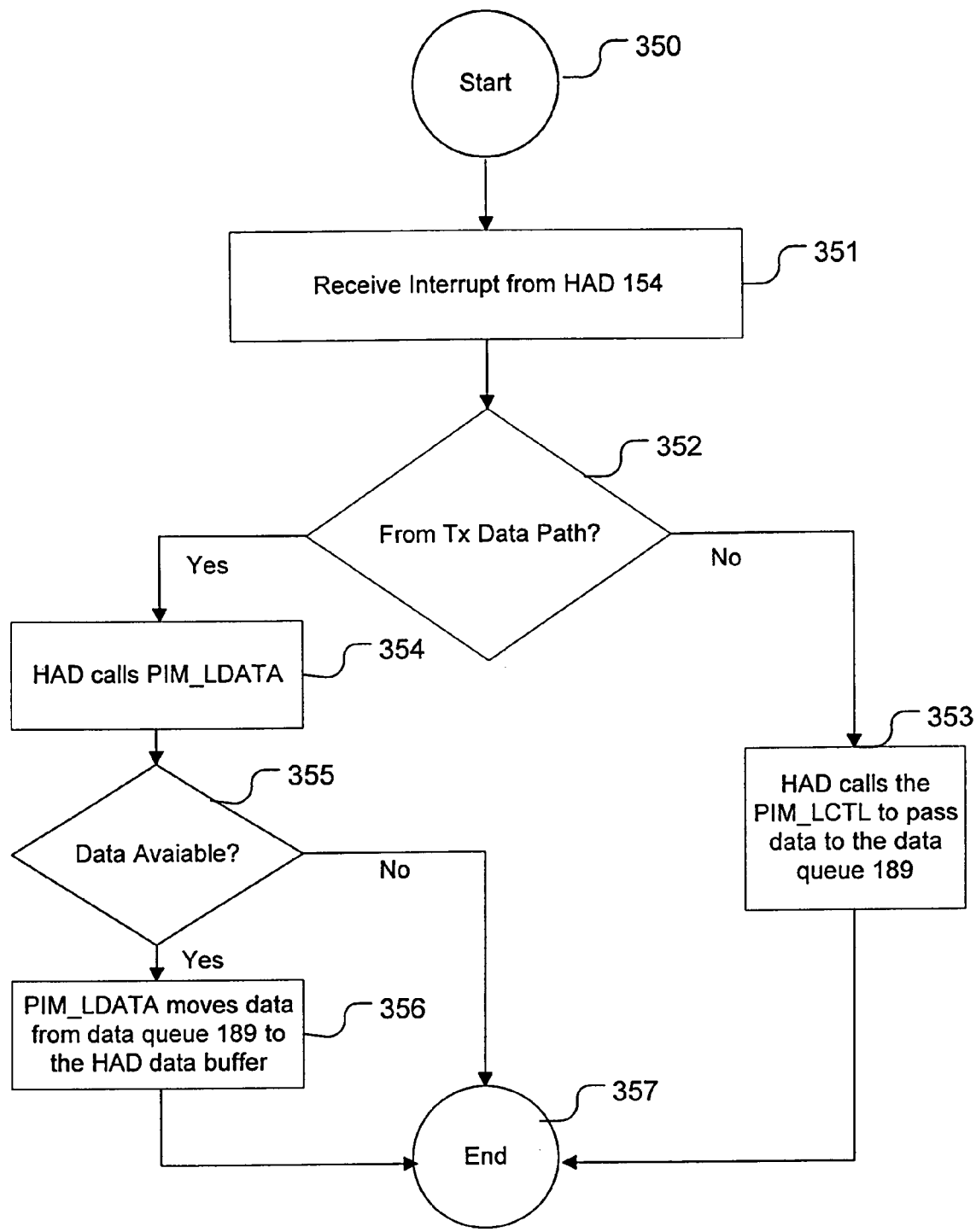
Fig. 14B  Data Flow Low Level

APPARATUS AND METHOD FOR CONNECTING A CELLULAR TELEPHONE TO A UNIVERSAL SERIAL BUS

The present application is a continuation of U.S. patent application Ser. No. 09/312,064, filed May 13, 1999 now U.S. Pat. No. 6,625,472.

BACKGROUND OF THE INVENTION

1. Field of the Invention

The present invention relates generally to a system and method for connecting a cellular telephone to a computer system, and more specifically to a system and method for connecting a cellular telephone to a personal computer system through a universal serial bus port.

2. Related Art

There is an increasing need for connecting portable computing devices to computer networks, such as the Internet. A very economical way to perform such connections is to make use of existing cellular telephones that are already in use by consumers. Thus, there is a great need for an efficient and economical means for connecting cellular telephones to portable computing devices, such as lap top computers, personal digital assistants (PDAs) and the like.

Several systems for connecting cellular telephones to personal computer systems exist today. The problem is that these current systems are very expensive both from a manufacturing standpoint and from a consumer standpoint. In addition, many of these systems require that the PC manufacture (or OEM) install a unique and proprietary cellular telephone connector to the PC motherboard or other device. Such unique connectors can only be used with specific cell phone cables that are also produced by the PC manufacturer or OEM. Thus, these current solutions prevent users from connecting their cellular telephones to other personal computer systems that lack the specific built-in and proprietary connectors.

Other solutions that are in existence today, for example, make use of a PCMCIA card to connect cellular telephones to personal computer systems. The advantage to using these systems is that they can be attached to any personal computer system that supports the Personal Computer Memory Card International Association (PCMCIA) standard.

However, the problem is that these systems are extremely expensive to manufacture. Furthermore, these devices, although relatively small, are bulky when compared to the size of many PDAs in existence today. Additionally, these devices require a separate proprietary cable in addition to the PCMCIA logic card. Still further, these devices include a micro-controller, which increases the expense, size, weight and power requirements of the device.

Therefore, what is needed is a system and method for connecting a personal computing system to a cellular telephone that is economical, small in size and weight, consumes low power and can be used with a variety of general-purpose computing systems.

SUMMARY OF THE INVENTION

Accordingly, the present invention is directed toward an economical system and method for connecting a cellular telephone to a personal computing device, such as a laptop computer or a personal digital assistant (PDA). The present invention can be made extremely small, has very low power requirements and is economical to manufacture. Furthermore, the present invention can be used with a variety of general-purpose computing systems.

In one embodiment of the present invention, a mobile phone interface (MPI) is molded between the ends of a Universal Serial Bus (USB) cable. One end of the USB cable is plugged into a standard USB port on any personal computing device that supports the USB standard. The other end of the USB cable is plugged into a cellular telephone.

The MPI comprises several logic components that are controlled by software installed on the personal computing system. Preferably, the MPI is implemented using integrated circuit technology such as an application-specific integrated circuit (ASIC) or the like. In this fashion, the MPI can be made extremely small and unobtrusive to the user. In fact, in a preferred embodiment, the MPI is not much wider than the USB cable itself.

The portability of the MPI is a distinct advantage of the present invention over current systems. In addition, the adaptability, (i.e. the ability to use the present invention with any personal computer that supports USB), is another distinct advantage of the present invention. Another advantage of the present invention is that it makes use of the attached computer system to provide the control for the MPI via software, thereby lowering the cost, size and power requirements of the USB adapter.

In one embodiment, the MPI comprises a USB serial interface engine (USB SIE), a digital translation block (DTB) and a cellular phone interface. The cellular phone interface component is used to provide electrical connections to the signals within the supported cellular telephone. Typically, the configuration of the cellular phone interface is in accordance with cellular phone interface standards. An example of such a standard is the NTT DoComo standard, which provides standard interfaces for particular cellular telephone systems in Japan. The advantage to using such standards is that the telephone interface connections do not vary between cellular handset manufacturers.

The DTB component of the present invention performs synchronous and asynchronous data transfer functions in accordance with the particular protocol implemented for each specific embodiment of the present invention. In addition, a typical embodiment includes data buffers to buffer the data between the USB bus and the cellular phone system. The USB serial interface engine performs serialization and de-serialization of USB transmissions as well as implementing the necessary communication protocol and set-up procedures in accordance with the USB standards.

Software for controlling the MPI and for interfacing between the application program running on the computer system and the MPI, is installed on the personal computer system. The software comprises a communication control stack, a hardware access driver and an external plug-in module. The communication control stack comprises an AT parser for parsing standard Hayes AT commands, a call control module for controlling the transfer of data and a number of internal plug-in protocol modules. In addition an external plug-in module is provided. The external plug-in module comprises an external protocol stack and may have its own AT and command parsers.

The external protocol stack comprises a control path and a data path. The control path is used to process control and status data and the data path is used to process communications data. The control path comprises a high level interface, a control stack and a low level interface. Similarly, the data path comprises a high level interface, a data stack and a low level interface.

The high level interfaces communicates with the communication control stack and the low lever interfaces communicate with the hardware access driver, which is closely coupled to the hardware in the MPI. The hardware access driver is interrupt-driven based on the hardware interrupt requests generated by the MPI. The control stack is used to format and store control and status data. The format of the control and status data is in accordance with the particular protocol being implemented by the external protocol stack.

Similarly, the data stack is used to format and store communications data. The format of the communications data is in accordance with the particular protocol being implemented by the external protocol stack.

BRIEF DESCRIPTION OF THE FIGURES

The present invention is described with reference to the accompanying drawings, wherein:

In the figures, like reference numbers generally indicate identical, functionally similar, and/or structurally similar elements.

FIG. 13A is a flowchart depicting a process that can be used to implement the high level portion of the control and status data flow.

FIG. 13B is a flowchart depicting a process that can be used to implement the low level portion of the control and status data flow FIG. 14A is a flowchart depicting a process that can be used to implement the high level portion of the communications data flow.

FIG. 14B is a flowchart depicting a process that can be used to implement the low level portion of the communications data flow

DETAILED DESCRIPTION OF THE PREFERRED EMBODIMENTS

Figure 1:
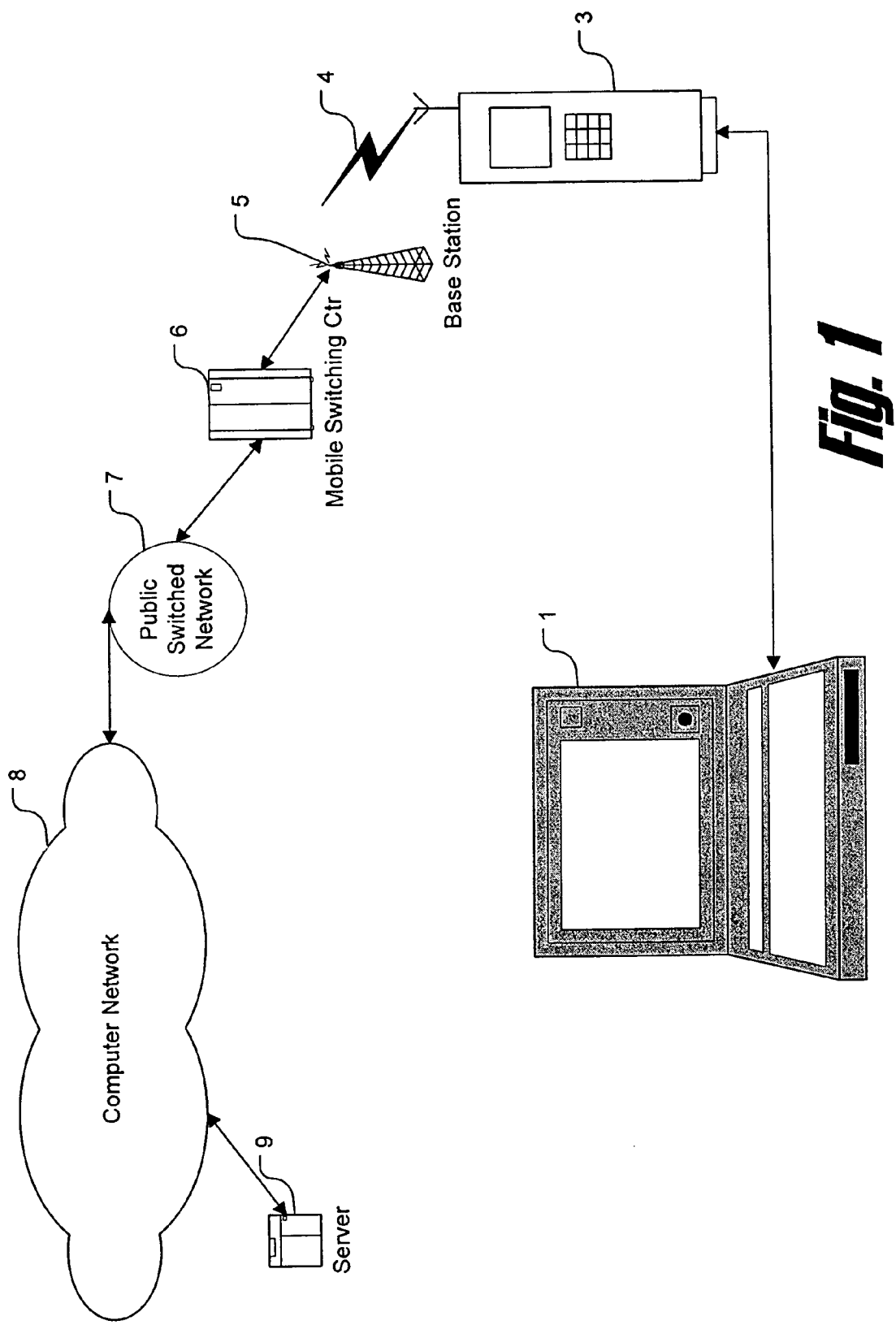
FIG. 1 is a diagram depicting a typical operating environment according to a preferred embodiment of the present invention.

FIG. 1 is a diagram depicting a typical operating environment according to a preferred embodiment of the present invention. A personal computing device 1, such as a laptop computer or a personal digital assistant (PDA) is in data communications with a server 9. The server 9 is typically coupled with a computer network 8, such as the Internet. A cellular telephonic device 3 (also referred to as a "cellular telephone" or simply, a "cell phone") is used to couple the computer system 1 with a typical cellular network.

In this example the typical cellular network is represented by a base station 5 that is coupled with a public switched telephone network 7, through a mobile switching center 6. Typically, the base station 5 comprises a radio transceiver used for communicating with the radio transceiver built into the cell phone 3. This forms the wireless link 4 of the communication channel. The wireless link 4 may comprise a digital or analog signals depending on the specific implementation of the present invention. In the example embodiments described below, digital cellular phone systems are used. The use of a digital cellular phone system in the examples below should not be construed to limit the scope and breadth of the present invention.

The base station 5 is typically coupled with the mobile switching center 6 via standard wired telecommunication transmission links. Similarly, wired transmission links are used to connect to the public switched network 7 and to the computer network 8. The wired link between the public switched network 7 and the Internet 8 is generally referred to as a point-of-presence with respect to the Internet 8.

In this example, the end-to-end communication path is completed at the server 9. The server 9 is also connected to the Internet 8 in some fashion. The configuration shown in FIG. 1 can be used for example, to connect a web browser application program running on the laptop computer system 1, with a world-wide-web server 9 on the Internet 8. Thus, for example, the laptop computer 1 can communicate in this fashion with any server coupled to the Internet 8.

Figure 2:
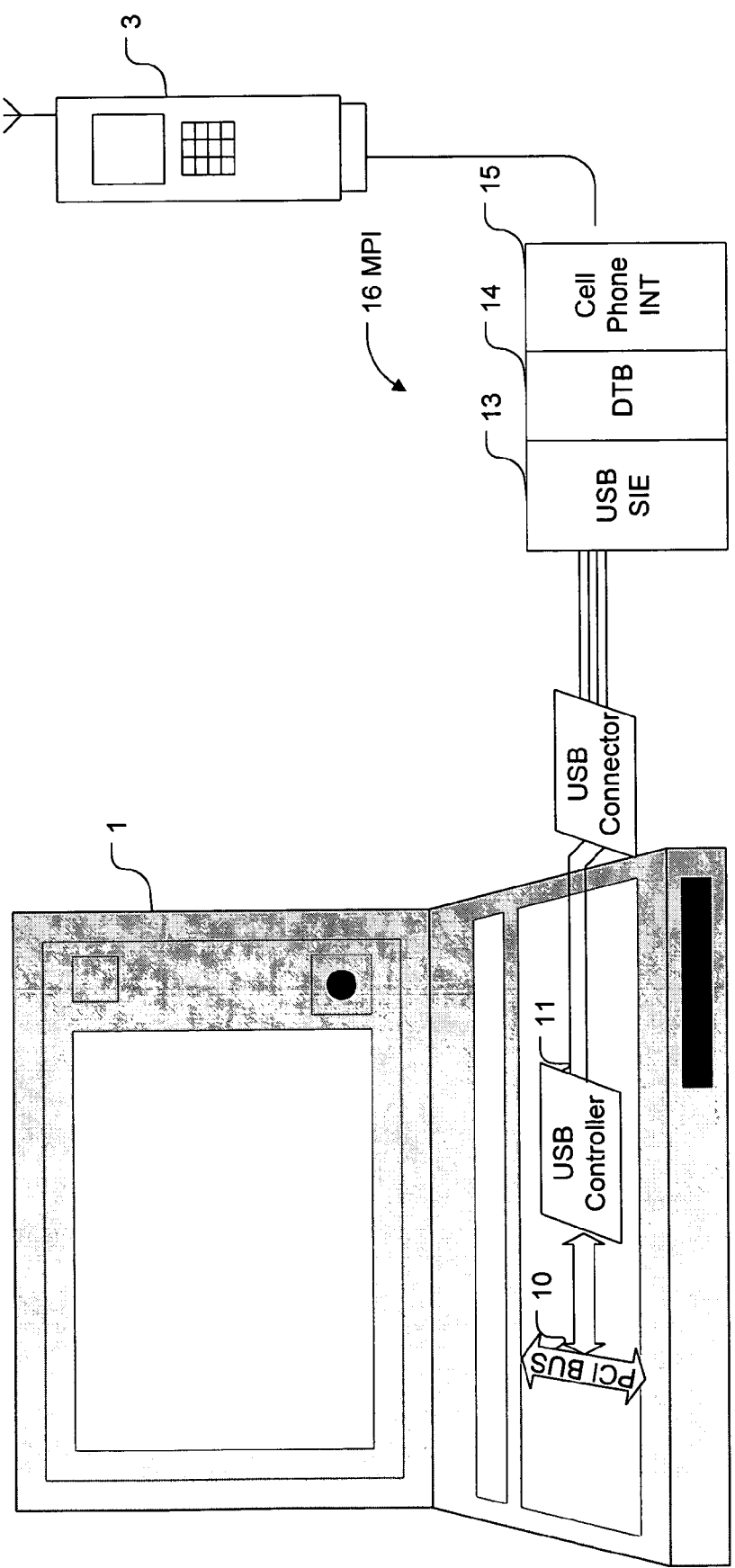
FIG. 2 is a block diagram depicting a detailed view of the connection between the cellular telephone and the computer system 1 in accordance with a preferred embodiment of the present invention.

FIG. 2 is a block diagram depicting a detailed view of the connection between the cellular telephone 3 and the computer system 1, in accordance with a preferred embodiment of the present invention. An example embodiment of the present invention is referred to herein as a mobile phone interface or "MPI" 16.

The MPI 16 comprises a Universal Serial Bus (USB) serial interface engine (USB SIE) 13, a digital translation block (DTB) 14 and a cell phone interface module 15. The cellular phone interface component 15 is used to provide electrical connections to the signals on the cellular telephone 3. The configuration of the cell phone interface is in accordance with the particular cellular phone 3 used to connect to the present invention.

The DTB 14 performs synchronous and asynchronous functions as necessary for the cell phone's data channel and control channel respectively. In addition, the DTB 14 buffers data between the USB SIE 13 and the cell phone interface module 15. The USB serial interface engine 13 performs serialization and de-serialization of USB transmissions as well implementing necessary communications and set-up procedures in accordance with the standard USB protocols.

As shown, the MPI 16 connects to a standard USB controller 11 through a standard USB connector 12. The USB controller 11 is typically built into the personal computer system 1. USB is a personal computer bus that can support up to 127 peripheral devices in a daisy chain configuration. One advantage to using USB is the use of inexpensive cables can be up to 5 meters long. In addition, as described below, the MPI 16 of the present invention can be implemented on a single ASIC. This reduces size requirements for the MPI 16 so that an embodiment of the present invention can be molded into a standard USB cable in a very inconspicuous manner.

In general, USB is a "plug-and-play" interface between a computer and add-on devices. Typical add-on devices that use the USB are audio players, joysticks, keyboards, telephones, external modems, scanners, and printers. One benefit to using USB technology is that new devices can be added without having to add an adapter card and without having to turn the computer system 1 off. The USB peripheral bus standard was developed by Compaq, IBM, DEC, Intel, Microsoft, NEC, and Northern Telecom.

In addition, since October 1996, the Windows® operating systems have been equipped with USB drivers or special software designed to work with specific I/O device types. USB is integrated into Windows 98. In addition, USB support was added to Windows 95. Thus, the Microsoft Windows 9x operating systems now support USB devices. As of mid-1998, most new computer systems have been equipped with one or more USB ports. USB ports are also becoming very popular on laptop computer systems and PDAs and the like. An embodiment of the present invention can be used with any device that supports USB.

As shown, the USB controller 11 is typically coupled to a standard Peripheral Component Interconnect (PCI) bus 10 on the personal computer system (also referred to a "PC") 1. However, the particular means to implement the USB I/O port is immaterial to the present invention as long as the USB peripheral bus standard is implemented. As will be described below, the USB SIE component 13 implements the USB peripheral bus standard for communicating between the DTB 14 and the USB controller 11.

Figure 3:
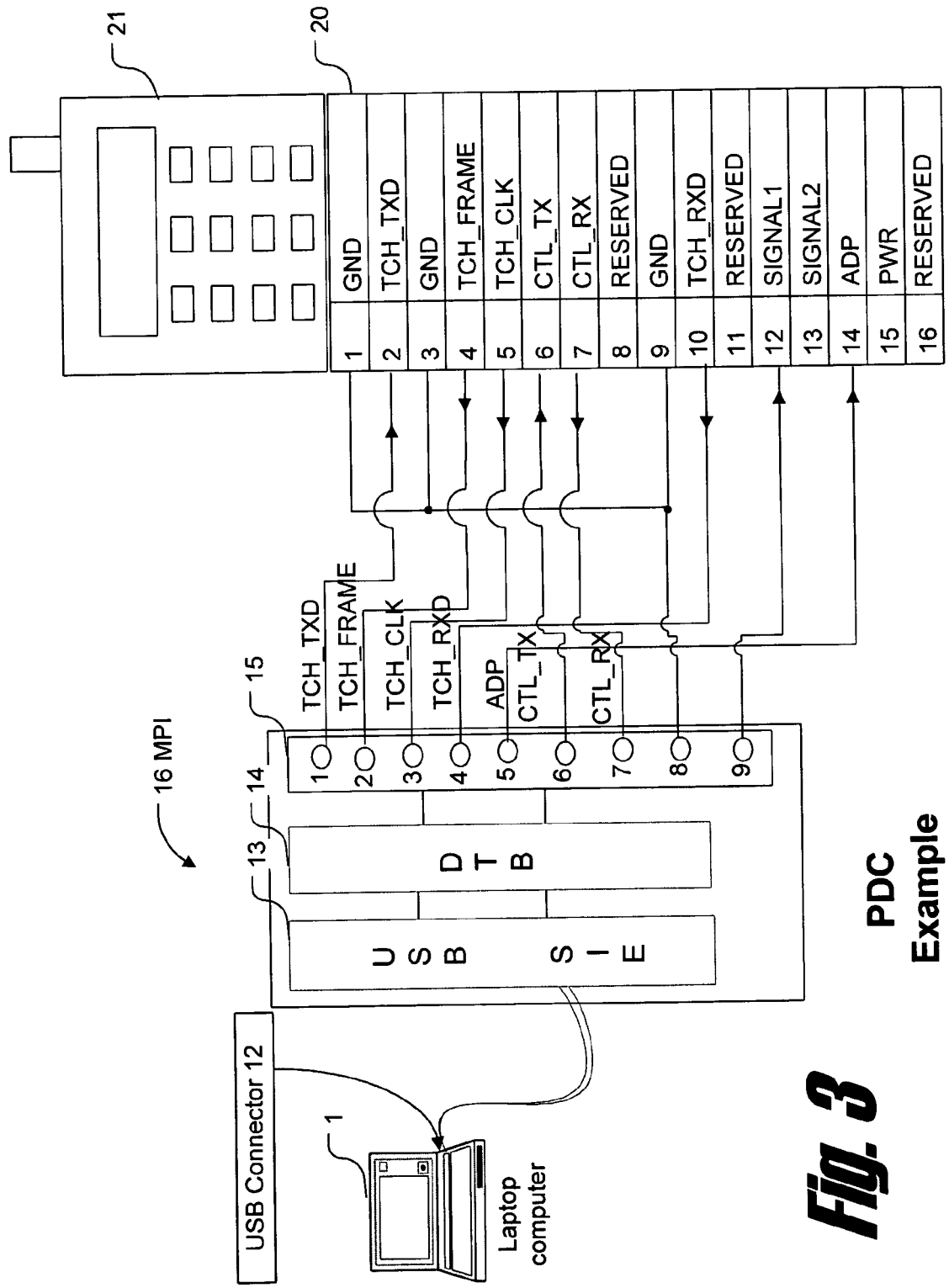
FIG. 3 is a block diagram depicting additional details of the MPI in accordance with one embodiment of the present invention.

FIG. 3 is a block diagram depicting additional details of the MPI 16 in accordance with one embodiment of the present invention. In particular, in this example, the MPI 16 is used to interface with a Personal Digital Cellular (PDC) cellular telephone 21. In the examples below a PDC phone system is used to describe an embodiment of the present invention. PDC is a widely used cellular phone system that, along with PHS, comprises a majority of the market share for cellular services in Japan. PHS stands for "Personal Handy-phone System" and its data communication system is called PIAFS (PHS Internet Access Forum Standard). PHS is a 64 kbps data communication service that began in 1998 as an update to an existing 32 kbps service.

PDC has two modes of data communications. The first mode is referred to as "High-Speed Data Mode" and provides data communications up to 9600 bps. The second mode of PDC is referred to as "Packet Mode" and provides packet data communications up to 28.8 Kbps.

It is noted that in the examples below, a PDC telephone system is used to distinctly point out and describe the details of a preferred embodiment of the present invention. Persons skilled in the relevant art(s) would appreciate that the present invention can be used with any type of cellular technology. Examples of other cellular technologies that can be used with the present invention include, but are not limited to GSM, CDMA and TDMA. Accordingly, by reading the present disclosure, persons skilled in the relevant art(s) would be able to apply the principals presented in the examples herein to other cellular telephone technologies for the purpose of implementing alternate embodiments of the present invention. As such, the examples presented herein should not be construed to limit the scope and breadth of the present invention.

In FIG. 3, a PDC telephone 21 is coupled to the MPI 16 in accordance with an embodiment of the present invention. A standard pin-out for a PDC telephone 21 is shown in block 20. In this example, the standard pin-out for the phone side 20 is in accordance with NTT DoComo standards for digital PDC cellular telephones. Additionally, FIG. 3 depicts the interconnection between the MPI 16 (specifically, the cell phone interface 15), and the standard PDC interface 20.

As stated, in this example using PDC, two modes of data communications are possible. The first mode is referred to as "High Speed Data Mode" and provides data communications up to 9600 bps. The pin-outs and definitions for PDC High Speed Data Mode are shown below in Table 1. The names of the signals correspond with the pin-out 20 as depicted in FIG. 3

TABLE 1

PDC High-speed Phone Side Data Mode Connector

| Name of Pin | PDC High Speed Data Mode Signal Description | Direction |
|---|---|---|
| TCH_TX | Transmit synchronous data (28 Bytes/frame) | PDC←PC |
| TCH_FRAME | This signal tells if the current frame is Rx (H) or Tx (L). | PDC→PC |
| TCH_CLOCK | Clock signal (42 kbps bit rate intermittent clock) | PDC→PC |
| CTL_TX | TX control serial data (600–9600 bps) | PDC←PC |
| CTL_RX | RX control serial data (600–9600 bps) | PDC→PC |
| TCH_RX | Receive synchronous data (28 Bytes/frame) | PDC→PC |
| ADP | Indication whether PC is connected to PDC | PDC←PC |
| PDC Control signal1 | Signal to enable the direct memory access of the PDC phone for Phone book support | PDC←PC |

The second mode of PDC is referred to as "Packet Mode" and provides packet data communications up to 28.8 Kbps. The pin-outs and definitions for PDC Packet Mode are shown below in Table 2. The names of the signals correspond to the pin-outs 20 as depicted IN FIG. 3.

TABLE 2

PDC Packet Mode Connector

| Name of Pin | PDC High-speed Data Mode Signal Description | Direction |
|---|---|---|
| TCH_TX | Transmit synchronous data (HDLC frame) | PDC←PC |
| TCH_FRAME | This signal tells if the system is in communication | PDC→PC |
| TCH_CLOCK | Clock signal (42 kbps LAPB clock) | PDC→PC |
| CTL_TX | TX control serial data (600–9600 bps) | PDC←PC |
| CTL_RX | RX control serial data (600–9600 bps) | PDC→PC |
| TCH_RX | Receive synchronous data (HDLC frame) | PDC→PC |
| ADP | Indication whether PC is connected to PDC | PDC←PC |
| PDC Control signal1 | Signal to enable the direct memory access of the PDC phone for Phone book support | PDC←PC |

Figure 4:
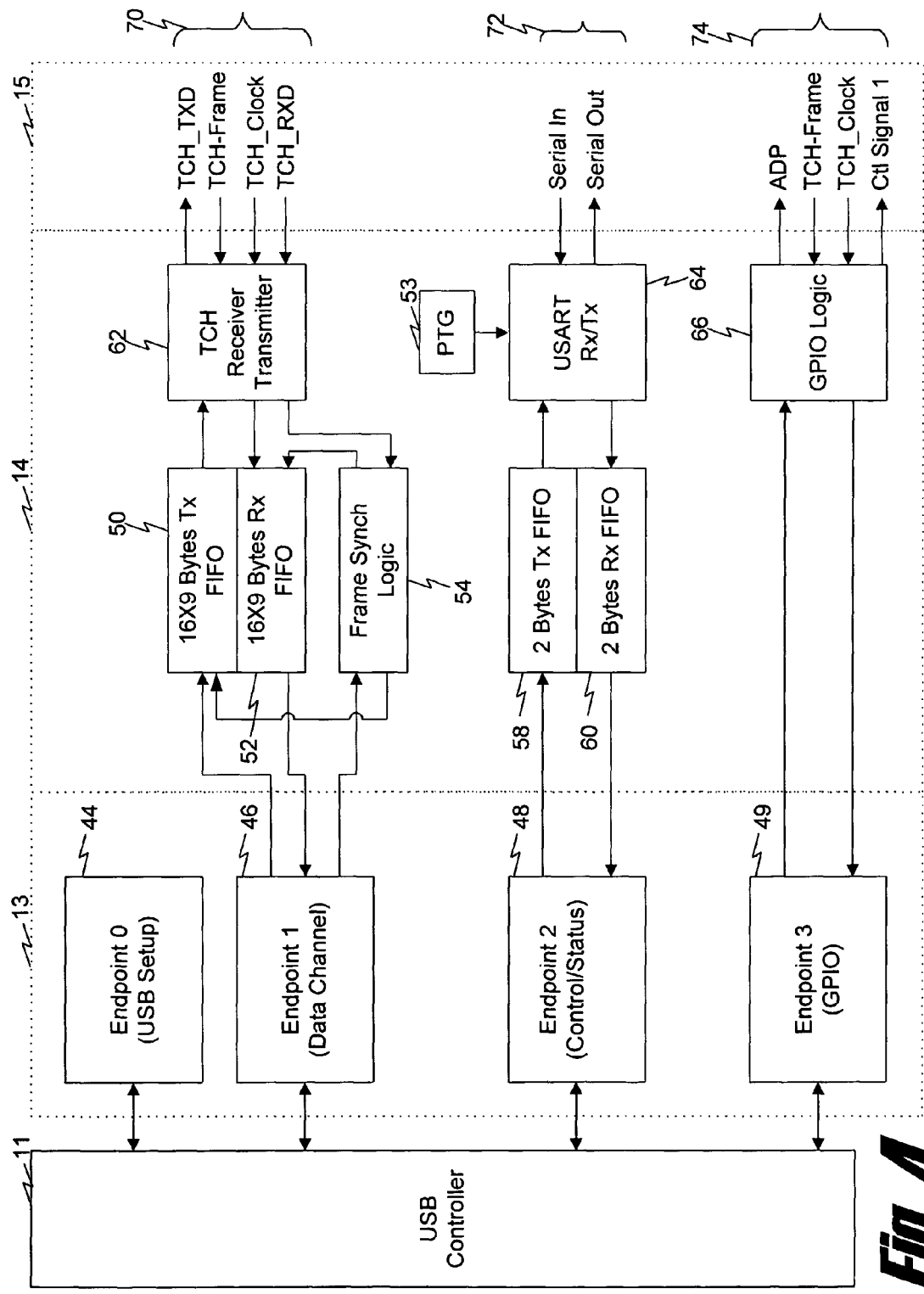
FIG. 4 is a block diagram depicting details of the MPI 16 at the component level.

FIG. 4 is a block diagram depicting details of the MPI 16 at the component level. As shown by the dotted lines, FIG. 4 is divided into three sections, each corresponding with the one of the three logical components of the MPI 16, specifically, the USB SIE module 13, the DTB module 14 and the cell phone interface module 15. The signals shown in the phone interface module 15 are the same signals as described above for the PDC cellular telephone 21 example.

The left side of FIG. 4 depicts the USB controller 11 that typically resides in the host computer system 1, as shown in FIG. 1. The USB controller 11 is coupled with the USB SIE 13 of the MPI 16. As indicated, the USB SIE 13 comprises four functional blocks 44, 46, 48 and 49 that correspond to the USB Endpoints 0,1, 2 and 3 respectively. For the purposes of the discussion herein, the USB Endpoints can be thought of as data pipes. The USB Endpoint modules 44, 46, 48 and 49 are implemented in accordance with USB protocol standards. Accordingly, the logic used to implement the USB Endpoints is dictated by the USB protocol standards. Such logic is well known and would be apparent to persons skilled in the relevant art(s).

As shown, the Endpoint-0 44 data pipe is used for USB setup. In this example, the Endpoint-1 46 data pipe is used for the data channel for sending and receiving data between the cell phone 3 and the USB controller 11. Endpoint-2 48 is used for the control and status channel between the USB controller 11 and the cell phone 3. Endpoint-3 49 is used in conjunction with a general-purpose input/output (GPIO) module 66 to manage 4 additional control signals required to operate the cell phone 3, as shown.

As stated, The DTB module 14 performs synchronous and asynchronous functions as necessary to manage the cell phone's data channel and control channel respectively. In addition, the DTB 14 buffers data between the USB SIE 13 and the cell phone interface module 15 as required in accordance with data transmission speeds and the implemented protocol.

In this example, a 16×9 FIFO is used to buffer the data channel in each direction. In particular, a transmit FIFO 50 is used to buffer data from the data channel USB Endpoint-1 46. Similarly, a receive FIFO 52 is used to buffer data from the TCH receiver/transmitter (TCH RxTx) 62. The depth of each data buffer, such as the data buffer 50, depends on the baud rate (i.e. maximum transmission speed possible) of each implementation of the present invention.

Figure 5:
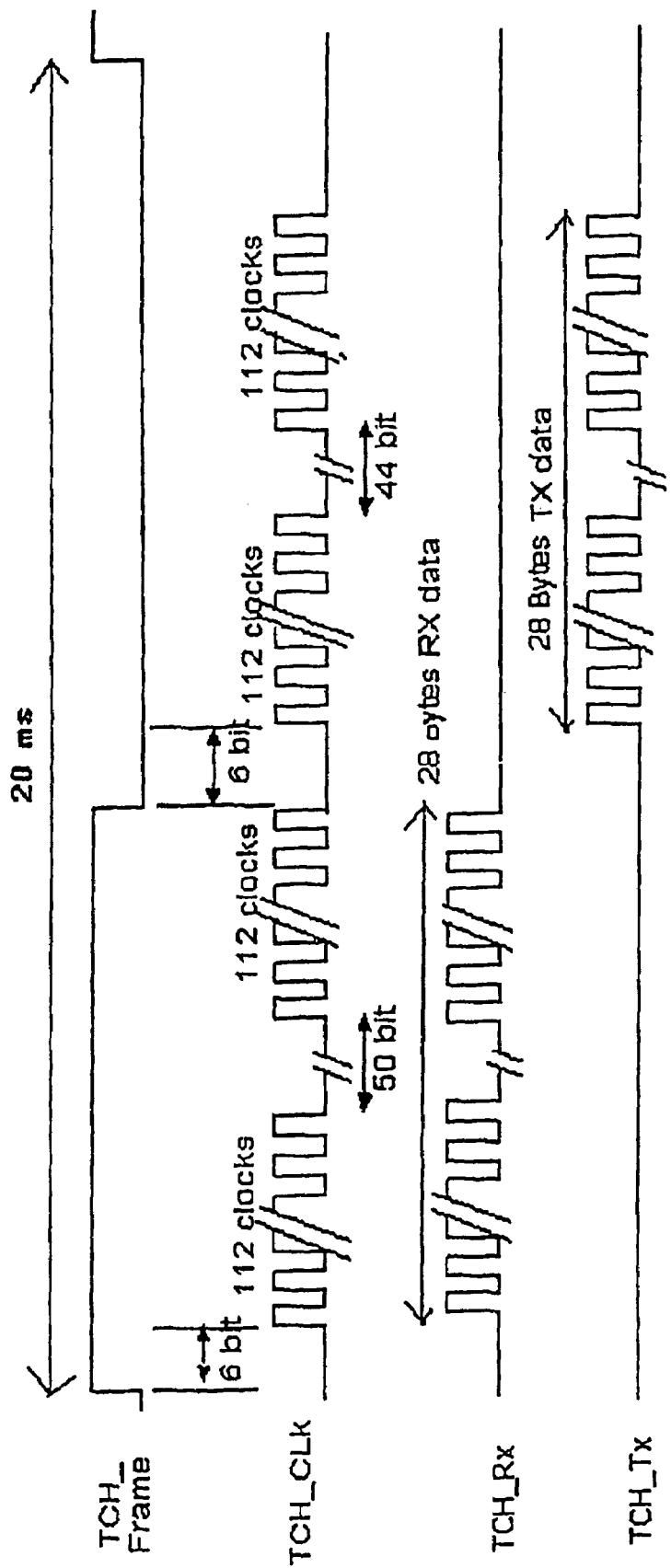
FIG. 5 is a timing diagram depicting the relations between signals for implementing the synchronous data transfer in accordance with one embodiment of the present invention.

Thus, the Endpoint-1 46 receives data from the USB controller 11. From there, the data is stored and queued in the 16×9 transmit FIFO 50. As described below, The TCH RxTx 62, which functions as a Synchronous Receiver/Transmitter, sends the data in a serial fashion from the FIFO 50 through the TCH_TXD signal. The TCH_Frame and TCH_Clock signals 70 are used to perform the necessary synchronous functions. In this example, when the TCH_FRAME signal 70 is high, data is received on the TCH_RX line synchronously with the TCH_CLOCK signal. Similarly, when the TCH_FRAME signal 70 is low, data is sent on the TCH_TX line synchronously with the TCH_CLOCK signal. A timing diagram shown in FIG. 5 illustrates the the various timings for the synchronous data flow in accordance with this example embodiment of the present invention.

Data received from the TCH_RXD line 70 is de-serialized by the TCH RxTx 62 and stored in the receive FIFO 52. Data from the receive FIFO 52, is sent through the Endpoint-1 46 data pipe to the USB controller 11.

Endpoint-2 48 is used for the control and status channel in this example. As noted, a two-byte transmit FIFO 58 and a two-byte receive FIFO 60 are used to buffer the control and status data. A standard Universal Synchronous/Asynchronous Receiver Transmitter (USART) 64 in asynchronous mode is used to serialize and de-serialize the control and status data. Thus, control and status data are sent to the PC 1 via the Serial In signal 72. This data is de-serialized and stored in the Rx FIFO 60. From there the data is sent to the Endpoint-2 48 data pipe to the USB controller 11. Similarly, control and/or status data is sent from the USB controller 11, to the Endpoint-2 48 data pipe. From there the data is stored in the Transmit FIFO 58 before it is serialized by the USART 64 and sent to the cell phone 3 via the Serial Out signal 72.

A precision time generator (PTG) 53 is used to control the baud rate of the asynchronous control/status channel. Specifically, one PTG 53 is connected to the receive side of the USART 64 and another PTG 53 is connected to the transmit side of the USART 64 to control the baud rate is both directions.

The Endpoint-3 module is used to drive the GPIO logic module 66 to send additional control signals from the PC 1 to the cell phone 3. Specifically, the GPIO logic module 66 is used to supply the Control signal-1 and the ADP signal to the cell phone 3. As indicated in the table above, in this example, the ADP signal indicates to the cell phone 3 whether the PC 1 is connected. Similarly, the PDC control signal 1 is used to enable direct memory access of the PDC 21 phone for phone book support. This is a feature that is specific to PDC. Other GPIOs can be added for other cellular phone system (like PHS, CDMA, . . . ).

As would be apparent to person(s) skilled in the relevant art(s), the particular functions implemented by the various USB Endpoints 44, 46, 48 and 49 are somewhat arbitrary and will vary depending on each implementation of the present invention. Accordingly, the examples presented herein should not be construed to limit the scope and breadth of the present invention.

Figure 6:
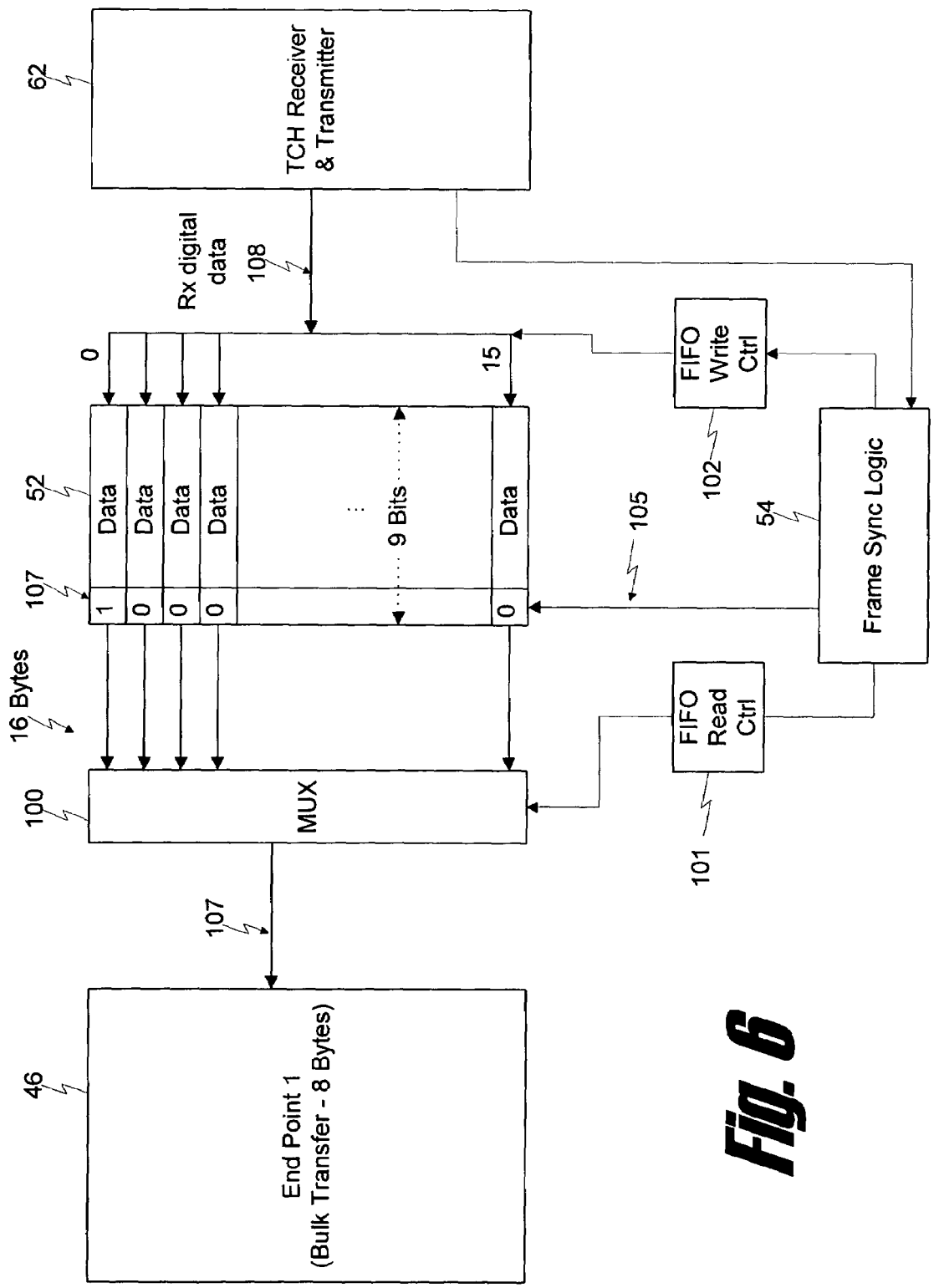
FIG. 6 is a block diagram depicting additional details of the data path from the cell phone to the computer system.

FIG. 6 is a block diagram depicting additional details of the data path from the TCH RxTx 62 to the Endpoint-1 block 46. The TCH RxTx 62 sends data 108 to the FIFO 52. The FIFO write control module 102 is used to set the proper address in the FIFO 50 to store the data 108. The TCH TxRx 62 is also connected to the Frame Sync Logic module 54. The Frame Sync Logic module 54 is used to mark the beginning of each data frame. As indicated, the beginning of each frame is marked with a "1" in the first bit position 107. The Frame Sync Logic module 54 is also connected to the FIFO read control module 101. The FIFO read control module 101 controls the Multiplexer (MUX) 100 for controlling the selection and transmission of data from the FIFO 50 to Endpoint-1 44. As indicated, in this example, a bulk transfer of 8 bytes is sent to the Endpoint-1 44 upon each data transfer. In accordance with standard USB protocol, this can occur at a maximum rate of once every millisecond.

Figure 7:
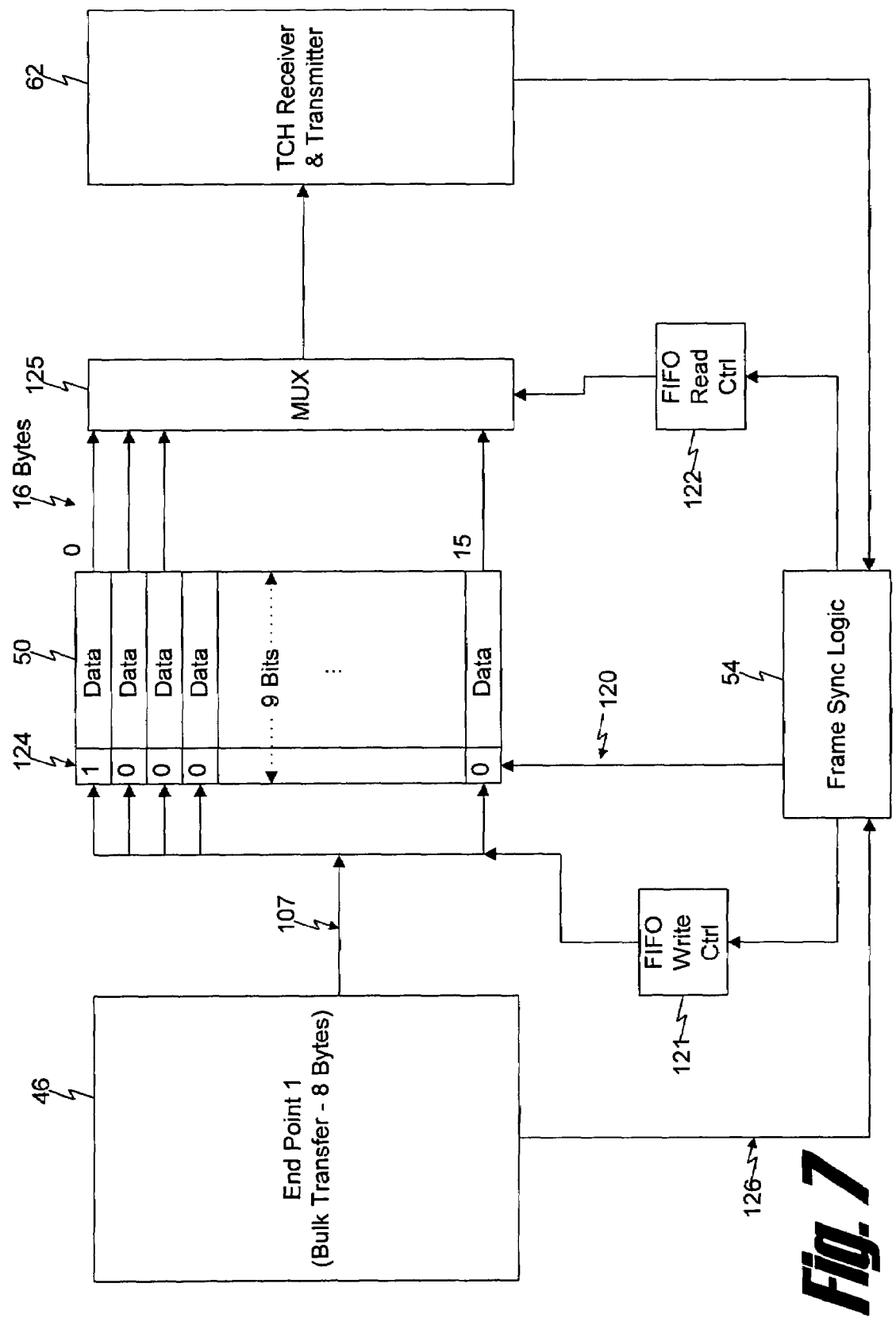
FIG. 7 is a block diagram depicting additional details of the data path from the computer system to the cell phone.

FIG. 7 is a block diagram depicting additional details of the data path from the Endpoint-1 44 to the TCH RxTx 62. Endpoint-1 44 sends data to the Receive FIFO 50. This transfer is controlled by the FIFO write control module 121, which sets the proper FIFO address so that data is stored in the proper location and in the proper order. The Frame Sync Logic module 54 is used to mark the beginning of each data frame by setting a "1" in the mark (i.e. first) bit position 124 to indicated the beginning of the frame, and by setting a "0" in the bit position 124 for all other data bytes. The TCH RxTx module 62 is also coupled with the Frame Sync Logic module 54 as shown. This connection enables the FIFO read control 122 to control the MUX 125 for sending data from the FIFO 50 to the TCH RxTx 62 when the TCH_FRAME signal is low.

Register settings for the precision time generators 53, the USART 64, the GPIO module 66 and the TCH Receiver/Transmitter 62 are described below. It is noted that these are examples depicting one method that can be used to implement the example embodiment and should not be construed to limit the scope and breadth of the present invention.

Precision Time Generator A (PTGA) and PTGB 53

The PTGA 53 is connected to the receive side of the USART 64 and PTGB 53 is connected to the Transmit side. Only one PTG 53 is shown in FIG. 4 for simplicity. Preferably, PTGA and PTGB 53 consist of five 8-bit registers and a 17-bit pulse accumulator. The three input registers are: PTG Mode Register, PTG Buffer, PTG Upper Latch. The two output registers are: PTG Lower Residue, PTG Upper Residue.

TABLE 3

Programmable Timing Generator A and B

| PTGA | PTGB |
|---|---|
| PTG Mode Register (PAM) | PTG Mode Register (PBM) |
| PTG Buffer (PAB) | PTG Buffer (PBB) |
| PTG Upper Latch (PAUL) | PTG Upper Latch (PBUL) |
| PTG Lower Residue (PALR) | PTG Lower Residue (PBLR) |
| PTG Upper Residue (PAUR) | PTG Upper Residue (PBUR) |

The contents of the three input registers are readable and writable. Whenever the CPU in the PC 1 writes to the PTG Upper Latch, the content of the PTG buffer is transferred to PTG Lower Latch. This allows a simultaneous 16-bit update of the input latch. Operation of the precision time generator is governed by the equation:

$$\text{Rate} = \text{Latch} * (\text{Internal clock rate in Hz})/2^{17}$$

TABLE 4

PTG Mode Register Bits

| Bit 7: PTG interrupt flag | This bit is read only. This bit is set to logic 1 when the PTG accumulator overflows. Reading or writing to PTG upper latch clears this flag. |
|---|---|
| Bit 6: PTG interrupt Enable. | When bit 6 is a logic 1, interrupt is asserted when the interrupt flag is set to a logic 1. |
| Bit 5–2: Not used. | |
| Bit 1: PTG output enable | When set to logic 1, output port is connected to the accumulator overflow. |
| Bit 0: PTG Timer Mode Select | When set to logic 1, PTG operates as a timer. When set to logic 0, PTG operates as a precision time generator. |

USART 64 (Control Channel) Registers

The USART 8 bit registers are defined as follows:
Serial-in-buffer (read only)
Serial-out-buffer (write only)
Serial Interrupt Register (SIR)
Serial Mode Register (SMR)
Serial Line Register (SLR)
Serial Status Register (SSR)
Serial Form Register (SMR)
SOUT Divider Latch
SIN Divider Latch
SYNC character A read to the serial-in-buffer removes data from the RXD input buffer. A write to the serial-out-buffer loads data into the TXD output buffer.

Serial Interrupt Register

TABLE 5

Serial Interrupt Register (SIR)

| SIR7 - RXD Status Interrupt Flag: | This bit is set to 1 whenever any of the following status signals are true: Frame error (SS3), parity error (SS2), or overrun error (SSR1). |
|---|---|

TABLE 5-continued

Serial Interrupt Register (SIR)

| | This bit is also set whenever the RXD status break interrupt (SS4) changes state. SIR7 is cleared by writing to the Status Register (SSR). |
|---|---|
| SIR6 - RXCLK Output Enable: | SIR6 is set to 1 for internally generated RXCLK to become an output signal. |
| SIR5 - TXCLK Output Enable: | SIR5 is set to 1 for internally generated TXCLK to become an output signal. |
| SIR4–3: Not Used. | |
| SIR2 - RXD Status Interrupt Enable: | When SIR2 and SIR7 are both set, interrupt is asserted. |
| SIR1 - TXD Buffer Empty: | This bit, when 1, enables interrupt to be asserted when the TXD buffer empty bit (SSR5) is also set. |
| SIR0 - RXD Buffer Full: | This bit, when is a logic 1, enables interrupt to be asserted when the RXD buffer full bit (SSR0) is also set. |

Serial Mode Register

TABLE 6

Serial Mode Register (SMR)

| SMR7 - TXD Mode enable | When 1, all TXD functions are enabled for either asynchronous or synchronous operation. |
|---|---|
| SMR6 - RXD Mode enable | When 1, all RXD functions are enabled for either asynchronous or synchronous operation. |
| SMR5 - USART timing source | This bit must be set to logic 0 in Basic 2. Then the assigned precision timing generator is the assigned USART timing source for all asynchronous or synchronous operations. |
| SMR4 - Synchronous Mode select | This bit must be set to logic 0, which selects asynchronous modes for all USART operations. |
| SMR3 - not Used | |
| SMR2 - TX Reference Clock Select | This bit must be set to logic 0, which selects the internally generated clock from the PTGA. |
| SMR1–SMR0 - Not used. | This is set to logic 0 for asynchronous operation. |

Serial Line Register

TABLE 7

Serial Line Register (SLR)

| SLR7 - Parity Stuff Bit | This bit is copied to the TXD parity bit position when SLR3 and SLR5 are both set to logic 1. |
|---|---|
| SLR6 - Set Break | If 1, the TXD signal is forced to a space, logic 0. Break is disabled by clearing this bit. |
| SLR5 - Enable Parity Stuff | When SLR5 and SLR3 are both set, SLR7 is copied to the TXD parity bit position. |
| SLR4 - Even Parity | When SLR3 is enabled and SLR5 is disabled, a one or zero is automatically inserted to the TXD parity position. The total number of ones in the data and parity fields is either odd (SLR4 = 0) or even (SLR4 = 1). |
| SLR3 - Enable Parity | If set to a logic 1, a logic 1 or 0 parity bit is inserted into the TXD parity position. The parity bit is positioned between the last data bit and first stop bit in the serial bit stream. |
| SLR2 - Two Stop Bits | When this bit is set in the asynchronous operation, a second stop bit is added to the TXD serial bit stream. |
| SLR1:0 - Word Length | SLR1  SLR0  Word Length<br>0     0     5 bits<br>0     1     6 bits<br>1     0     7 bits<br>8 bits |

Serial Status Register

TABLE 8

Serial Status Register (SSR)

| | |
|---|---|
| SSR7 - RXD Parity Bit | This bit copies the received parity bit. |
| SSR6 - TXD Under-run | This bit is set to a logic 1 whenever the TXD shift register empties and the TXD input buffer has not been loaded by the CPU. SSR6 is cleared when the CPU writes new data to the TXD input buffer. |
| SSR5 - TXD Buffer Empty | This bit is set to indicate that the RXD input buffer is empty. |
| SSR4 - RXD break Interrupt | This bit is set to logic 1 whenever the RXD data input is held in the space (logic 0) state continuously from the start bit to the first stop bit. This bit is cleared when a mark bit (logic 1) is detected. |
| SSR3 - RXD Framing Error | SSR3 is set when RXD channel detects an incorrect stop bit and cleared when a correct first stop bit is detected. |
| SSR2 - RXD Parity Error | SSR2 is set when a parity error is found. |
| SSR1 - RXD Overrun Error | SSR1 is set when a new data is being transferred from the RXD shift register to the RXD output buffer and the previous data in the output buffer has not been read by the CPU. |
| SSR0 - RXD Buffer Full | SSR0 is set when a new character from the RXD shift register is downloaded into the RXD output buffer and cleared when the CPU reads the contents in he RXD output buffer. |

Serial Form Register

TABLE 9

Serial Form Register (SFR)

| | |
|---|---|
| SFR7 - Not used. | Set to logic 0. |
| SFR6 - Not used. | Set to logic 0. |
| SFR5 - TXD to RXD loop-back | When SFR5 = 1, the RXD input pin is routed as a TXD output pin. |
| SFR4 - Not used. | Set to logic 0. |
| SFR3 - Not used | Set to logic 0. |
| SFR2 - PTG Div by 3 Bypass: | When SFR2 = 1, the PTG direct timing is selected when SMR5 = 0. When SFR2 = 0, the PTG timing is divided by 3. |
| SFR1 - 0: Short Stop Bit. | This must be set to 0 for 1-bit width stop bit. |

Serial Out Divider Latch (SODL)

This is restricted to a value of $0F for asynchronous operation. Each time CPU 1 writes to the SODL, the new latch value is download to the SOUT programmable counter in the USART.

Serial In Divider Latch (SIDL)

When asynchronous operation is selected, the latch should contain a hex value of $0F.

GPIO Logic Block 66

TABLE 10

GPIO Registers

| Register Name | R/W | Bit Positions |
|---|---|---|
| GPIN | R | 8:0 |
| GPOUT | R/W | 8:0 |
| GPO_MODE | R/W | 8:0 |
| GPDIR | R/W | 8:0 |

GPIN[8:0]=GPIO inputs.

GPOUT[8:0]=GPIO outputs. Writing to bits programmed as inputs does nothing.

GPDIR[8:0]=>'0' programs the particular GPIO to be an input. A logic 1 programs the corresponding GPIO to be an output. 0x0000 is default.

GPO_MODE register controls the behavior of GPIO pins. When a GPIO is an input, GPO_MODE[x]=1 indicates that GPIO[x] generates level interrupts. Otherwise, GPIO[x] generates edge interrupts. When a GPIO is an output, GPO_MODE[x]]=1 indicates that GPIO[x] is an open drain driver. Otherwise, GPIO[x] is a pullup/pulldown (totem-pole) driver.

TCH Receiver/Transmitter 62 (Synchronous Data Channel)

The data channel uses the following 8 bit registers:

Control register

Status register

Data register (7:0) low byte

Data register (15:8) high byte

Interrupt Mask register

Control Register:

Read/write register on all bits

Default value of the register—0x00

Bit 0—Inverted Interrupt Request. When high the output Interrupt Request output pin will be active low. When low the output Interrupt Request output pin will be active high.

Bit 3—PDC transmitter enable. When high allows performing a transmission via PDC block. When low it resets all transmitter machine and counters.

Bit 7—PDC receiver enable. When high allows performing receiving from PDC block. When low it resets all receiver machine and counters.

Bits 6,5,4,2,1 are reserved.

Status Register:

Bits 4, 0 are read only; bits 7, 6, 5, 3, 2, 1 are read/cleared by 1 writing Default value of the register—0x00

Bit 0—Transmitter FIFO is not full. It is set when transmitter FIFO contains at least 1 empty byte. It is cleared when amount of bytes written to the Data register and not yet transmitted by PDC block equals to the transmitter FIFO size.

When bit 3 (PDC transmitter enable) of the Control register is low then bit 0 of the Status register is always zero.

Bit 1—Transmitter FIFO 50 is overrun.

It is cleared when bit 3 of the Control register is low or by "1" writing to bit 1 of the Status register.

Bit 2—Transmitter FIFO 50 is underrun.

It is cleared when bit 3 of the Control register is low or by "1" writing to bit 2 of the Status register.

Bit 3—TCH_FRAME negative front detected.

It is cleared when bit 3 of the Control register is low or by "1" writing to bit 3 of the Status register.

Bit 4—Receiver FIFO 52 is not empty. It is set when receiver FIFO 52 contains at least 1 received byte. It is cleared when amount of bytes received by PDC block and not read from the Data register equals zero.

When bit 7 (PDC receiver enable) of the Control register is low then bit 4 of the Status register is always zero.

Bit 5—Receiver FIFO 52 is overrun.

It is cleared when bit 7 of the Control register is low or by "1" writing to bit 5 of the Status register.

Bit 6—Receiver FIFO 52 is underrun.

It is cleared when bit 7 of the Control register is low or by "1" writing to bit 6 of the Status register.

Bit 7—TCH_FRAME positive front detected.

It is cleared when bit 7 of the Control register is low or by "1" writing to bit 7 of the Status register.

Data Register

Always write in order: Data Register high byte—first; Data Register low byte—second. Always read in order: Data Register high byte—first; Data Register low byte—second. Default value of the register—0x0000

For Writing:

Bits 7–0—Byte of data to be transmitted itself.

Bit 8—"First byte in the frame" marker. It is high if the byte (bits 7–0) is considered as the first byte is in PDC frame. If bit 8 is low the byte will be transmitted as not the first byte in the PDC frame.

Bits 14–9—reserved, ignored by PDC transmitter.

Bit 15—"Valid byte" marker. If this bit is low the byte in bits 7–0 will be ignored already at transmitter FIFO 50 level. When bit 15 is high the byte written to the bits 7–0 will be transmitted.

Note that when there is no data in transmitter FIFO 50 the high level is generated on transmitter output.

For Reading:

Bits 7–0—Byte of data received itself.

Bit 8—"First byte in the frame" marker. It is high if the byte (bits 7–0) received was the first byte is in PDC frame. If bit 8 is low the byte was not the first byte in the PDC frame.

Bits 14–9—reserved, always return zeros.

Bit 15—"Valid byte" marker. It is low when receiver FIFO 52 is empty and read operation from the Data register was useless (additionally bits 7–0 of Data Register will be 0xFF when read). When bit 15 is high the byte in the bits 7–0 really was received by PDC block and placed in the receiver FIFO 52.

Interrupt Mask Register

Read/write register on all bits

Default value of the register—0x00

Bit 7:0—Interrupt request enable bits. When bit 'i' is high it allows for bit 'i' of the Status register to be propagated to the Interrupt Request output pin.

Figure 8:
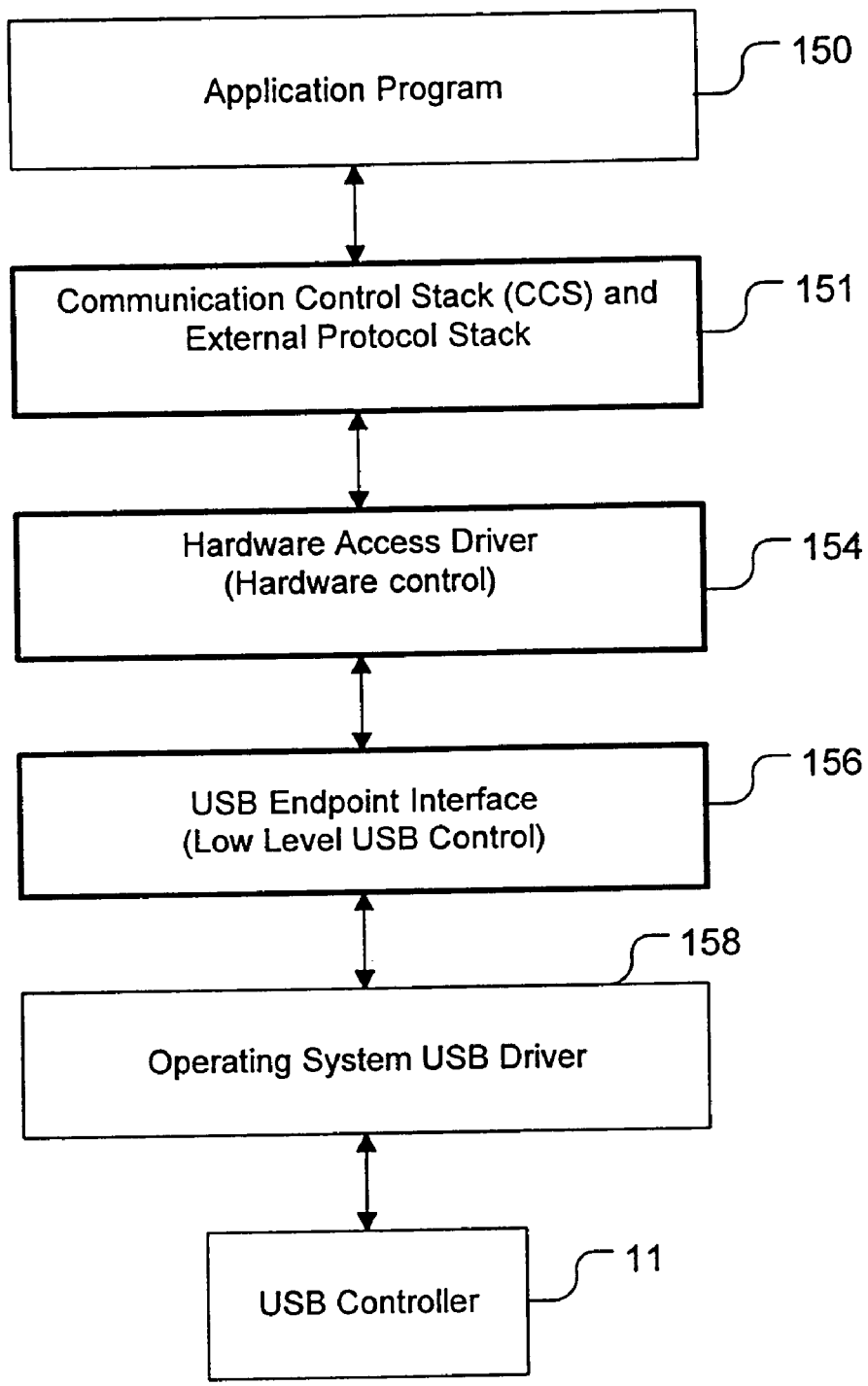
FIG. 8 is a block diagram depicting various software modules comprising the present invention and other software modules associated with an embodiment of the present invention.

FIG. 8 is a block diagram depicting various software modules comprising the present invention and other software modules associated with an embodiment of the present invention. The software components shown in FIG. 8 are executed on the computer system 1. The software modules that comprise an embodiment of the present invention are shown as the highlighted modules 151, 154 and 156.

In this example, the operating system used to describe an embodiment of the present invention is the Microsoft Windows 9x operating system. It is noted that this operating system is just one example of an operating system that can be used to implement the present invention. In other embodiments, different operating systems can be used such as Windows NT, MAC operating systems, UNIX operating systems and the like. In fact, as described below, the modular software design architecture of the present invention supports the ability to port to different operating systems with minimal effort. The use of the Windows 9x operating system to implement the embodiment of the present invention described in the examples presented herein should not be construed to limit the scope and breadth of the present invention.

The first module represented in FIG. 8 is the application program component 150. An example of an application program 150 is a web browser, such as the Internet Explorer or Netscape Navigator. Another example of the application program is a data terminal emulation program, such as HyperTerminal. The application program 150 is also referred to as the "DTE" or data terminal emulation program.

The last block in FIG. 8 is a hardware component, namely the USB controller 11. The software modules between the application program 150 and the USB controller 11 are described below.

Block 151 represents two components of the present invention, namely the communication control stack (CCS) and the external protocol stack. As described below, in this example embodiment, the CCS is a generic "modem" controller that can be used with numerous communication hardware devices. The external protocol stack can be viewed as a plug-in module (PIM) to the CCS. In this fashion, different external protocol stacks can be added by simply creating new modules. Thus, the core software in the CCS does not need to be altered when new "external" protocols are added.

As described below, the communication control stack 151 supports AT-style commands, off-line and on-line data modes, data and facsimile capabilities, and other necessary functions generally associated with network communications.

In general, the external wireless stack 151 is used to generate and/or receive data and control frames in accordance with the implemented wireless protocol. For example, the external wireless stack 151 receives data from the application program 150 and creates data frames to be sent to the wireless telephone 3 in accordance with the PDC protocol.

As shown, the CCS and the external protocol stack 151 interfaces with the hardware 11, through the hardware access driver (HAD) 154. The HAD 154 is described in detail below. The HAD 154 is used to control the flow of data to and from the USB stack associated with the USB controller 11 and the MPI 16.

As shown, the HAD 154 interfaces between CCS and external protocol stack 151 and the USB Endpoint Interface module 156. The USB Endpoint Interface module 156 is used to interface with a USB driver 158 and adds USB frames to the data sent to the USB controller 11 in accordance with USB protocol standards. Similarly, the USB Endpoint interface module 156 removes USB frame information from the data sent from the USB controller 11. The block 158 represents a USB driver that is typically provided by the operating system. The operating system USB driver 158 interfaces between the USB controller 11 and the USB Endpoint Interface module 156.

Figure 9:
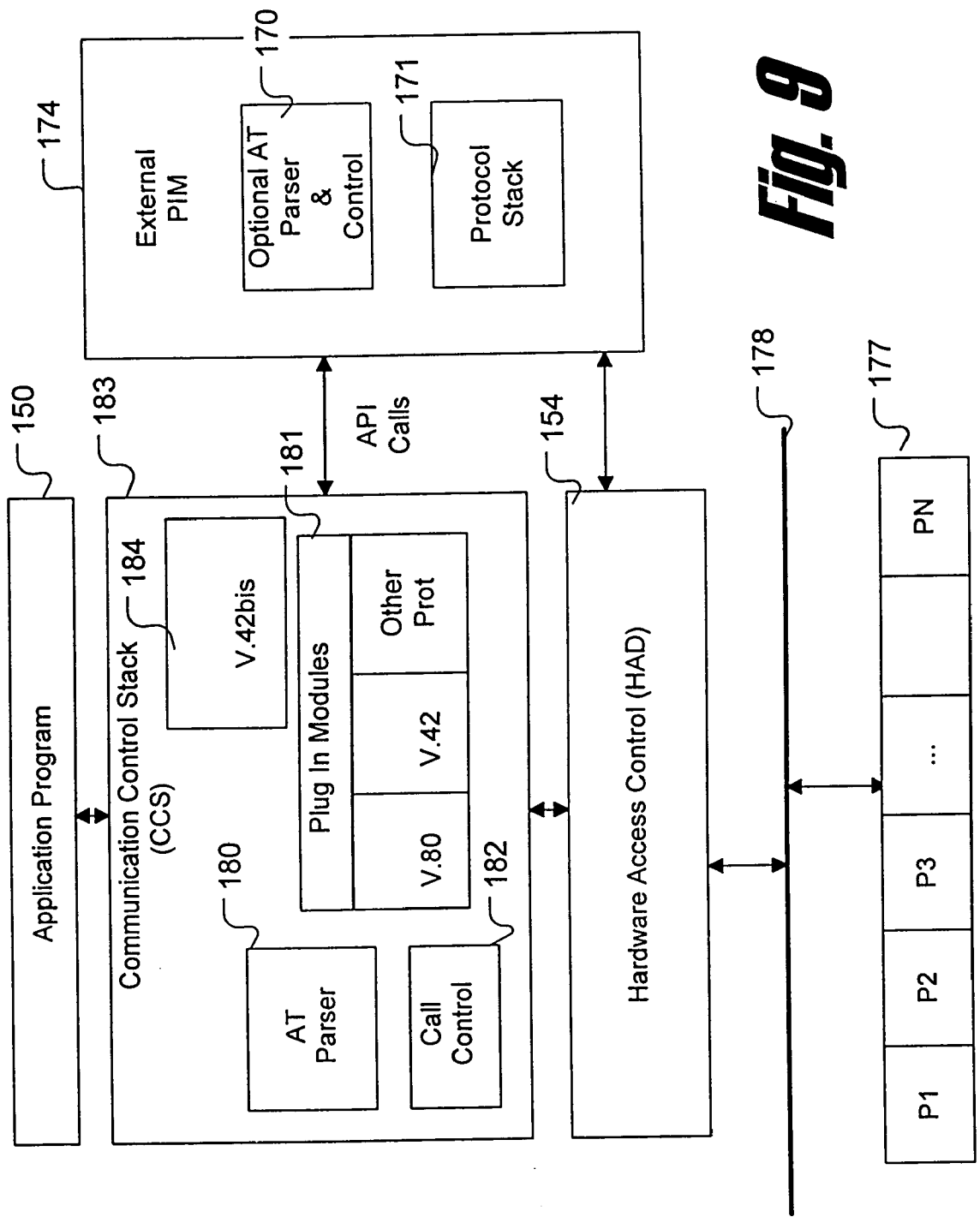
FIG. 9 is a block diagram depicting details of the software modules and their interrelations in accordance with a preferred embodiment of the present invention.

FIG. 9 is a block diagram depicting additional details of the software modules and their interrelationships in accordance with a preferred embodiment of the present invention. As shown, the application program interfaces with the communications control stack (CCS) 183.

The CCS 183 comprises an AT parser 180, a call control module 182, a V.42bis protocol stack 184 and numerous plug-in modules 181. It is noted that each of the components described in the present specification, such as the v42bis 184 component and the plug-in modules 181, may be implemented as a separate executable program. Alternatively, one or more of the components may be combined within a single executable program.

The particular arrangement of the software modules is somewhat arbitrary and will generally vary with different embodiments of the present invention. Thus, the arrangements of the software modules in the examples herein, are used for exemplary purposes only to particularly point out and describe the general functionality of the present invention. As such, the arrangement and division of software components used to describe these examples should not be construed to limit the scope and breadth of the present invention.

The AT parser 180 is used to parse AT commands in accordance with the standard Hayes AT command set. The V.42bis module is used to implement compression and error correction algorithms, etc. in accordance with the V42bis standard. The call control module 182 is used to generate messages and to control the flow of data in accordance with the present invention.

As shown, the plug-in modules 181 may comprise one or more particular protocols that can be used with an embodiment of the present invention. In this fashion, the modular architecture of the CCS 183 allows for additional protocols to be added without affecting existing modules. For example, many different protocols can be supported by an embodiment of the present invention. This feature is illustrated in FIG. 9 by the different protocols P1, P2, ... PN 177 coupled with the PCI bus 178. For example, when a new hardware device is supported, a new PIM can be added to 181 to implement such support.

In addition to the plug in modules 181, the external plug-in module or "external PIM" (also referred to as external or wireless protocol stack) 174 can be used to implement additional protocols without effecting modules within the CCS 183. In this example, the wireless PDC protocol is implemented in this fashion. Accordingly, the external PIM 174 is viewed as an additional PIM supported by the CCS 183. As shown, the CCS 183 and the external PIM 174 communicate through a pre-defined application programming interface (API). An example of a particular API that can be used in a preferred embodiment of the present invention is described in detail below.

As shown, the external PIM 174 comprises an AT parser and control module 170 and a protocol stack 171. Details of the protocol stack 171 are described below with reference to FIG. 10. In this example, the AT parser & control module 170 is an optional component that is used to parse AT commands when an external PIM 174 is active. That is, if this option is used the AT parser and control module 170 is used instead of the AT parser 180 and control modules 182 in the CCS 183, while the external PIM 174 is active. Thus, all AT commands, after the initial AT command used to load the external PIM 174, and up to and including the AT command used to unload the external PIM 174, are processed by the AT Parser and control module 170. Alternatively, if a separate AT parser 170 is not required by the specific implementation of the present invention, the AT parser 180 and control module 182 in the CCS 181 is used for all purposes.

Figure 10:
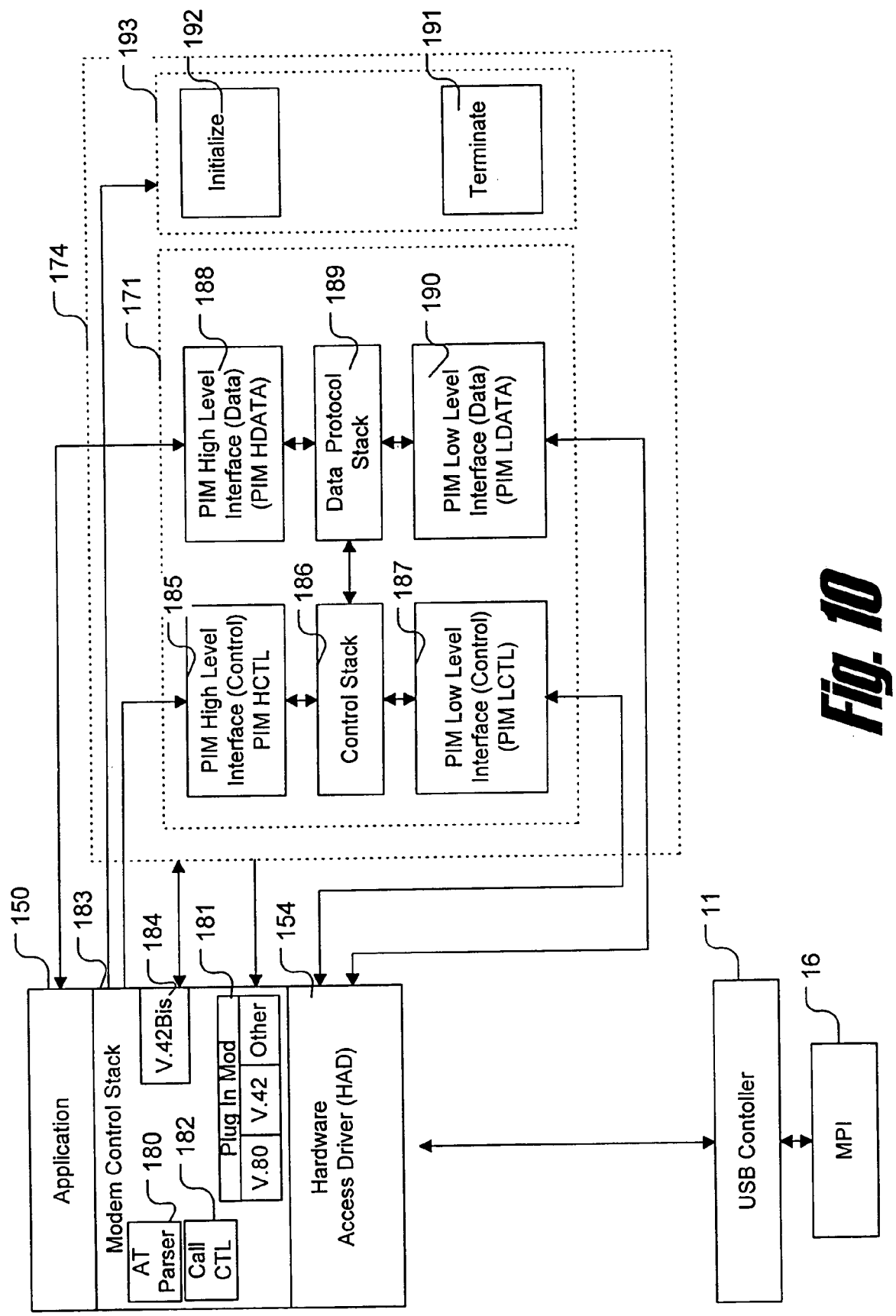
FIG. 10 is a block diagram depicting additional details of the wireless protocol stack that can be used to implement the PDC protocol example.

FIG. 10 is a block diagram depicting additional details of the wireless protocol stack 171 that can be used in the PDC protocol implementation described in the example embodiments herein. As shown, the application program 150 interfaces with the CCS 183. In this example, the CCS 183 comprises the same components as the previous example, namely the AT parser 180, the call control module 182, the V.42bis protocol stack 184 and the plug-in modules 181.

Details of the external PIM 174 are shown in FIG. 10. In particular, the external PIM comprises an initialize and terminate module 193 and a protocol stack 171. The protocol stack 171 comprises the following components. As stated, the PDC protocol comprises a data channel and a control channel. In this example, the three modules 185, 186 and 187 are used to implement the control channel. Similarly, the three modules 188, 189, and 190 are used to implement the data channel.

The two modules 185 and 188 at the top of the PIM 171 are referred to as "high level modules" and the two modules 187 and 190 at the bottom are referred to as "low level" modules. These designations are based on the module's relative distance to the MPI hardware 16. That is, the low level modules 187 and 190 are closest to the hardware 16 relative to the high level modules 185 and 188. As will be described below, the low level modules 187 and 190 are hardware-interrupt-driven, and the high level modules 185 and 188 are timer driven.

The high level modules used to implement the control channel and data channel are referred to as PIM HCTL 185 and PIM HDATA 188, respectively. Similarly, the low level modules used to implement the control and data channels are referred to as the PIM LCTL 187 and PIM LDATA 190, respectively.

The PIM HCTL 185 is called by the call control module 182 in the CCS 183. The control stack 186 is used to store formatted control data in accordance with the particular wireless protocol being implemented, in this example, PDC. Thus, the control stack 186 is used to temporarily store data frames that are to be sent to the cellular telephone 3 via the MPI 16.

The PIM low level modules 187 and 190 are interrupt driven by the components in the MPI 16. For example, when the Tx FIFO 58 is ready to accept data, an interrupt signal is generated. This causes the HAD 154 to call the PIM LCTL 187 to determine if there is any data waiting on the control stack 186. If data is available, the PIM LCTL 187 fetches the framed data from the control stack 186 and sends it to the MPI 16 via the USB controller 11.

The PIM HDATA 188 is called periodically to exchange data with the application program 150. For example, in one implementation, PIM_HDATA 188 is called by the call control module 182 every 10 milliseconds to transmit and receive data. Data that is sent from the application program 150 is formatted in accordance with PDC protocol standards and queued in the data protocol stack 189. From there, based on hardware interrupts that are controlled through an interrupt service routine in the HAD module 154, the data is transferred to the Tx FIFO 50. Additional details of example data and control mechanisms in accordance with a preferred embodiment of the present invention are described below.

In addition, the external PIM 174 comprises an initialize module 192 and a termination module 191. The CCS 183 initializes and terminates the external PIM 171 by calling the 192 and 191 modules. Details of the initialize and terminate functions are described below.

Figure 11:
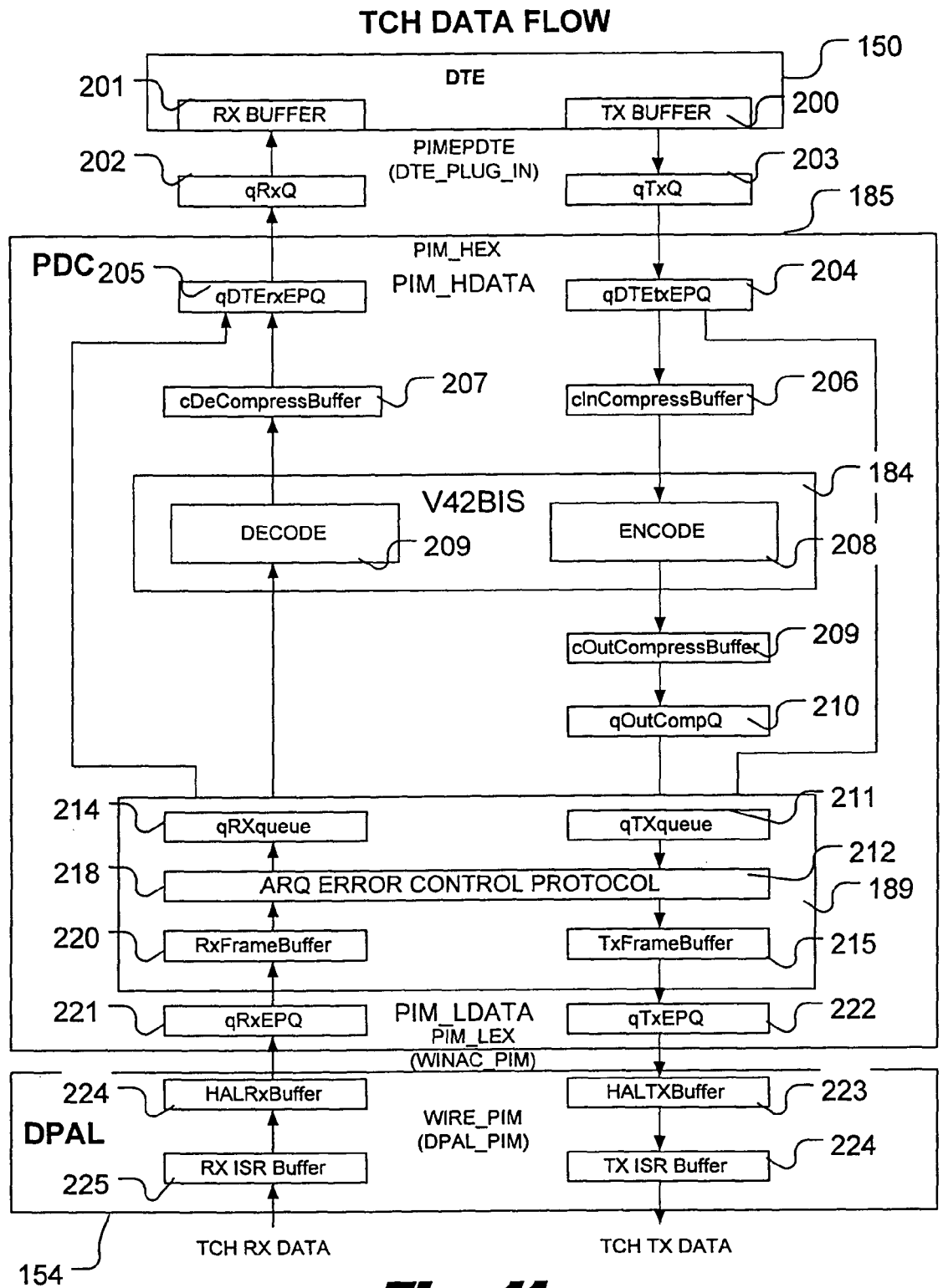
FIG. 11 is a block diagram depicting additional details of the software modules used to illustrate the data flow in accordance with one embodiment of the present invention.

FIG. 11 is a block diagram depicting additional details of the data flow between the MPI 16 and the application program (also referred to as DTE) 150. In the figure below, storage locations that are queues end with a "Q" or a "queue" designation. Buffer storage devices are referred to with a "Buffer" designation as part of the name.

Data sent from the DTE 150 gets stored in the DTE's TX buffer 200. This buffer is used whenever the application program 150 sends data. From the TX Buffer, the data is moved to the qTxQ 203 in the CCS 183. As stated, in a typical implementation, the CCS 183 calls the PIM_HDATA 185 (also referred to as PIM_HEX) periodically. For example, once every 10 milliseconds, the CCS 183 calls the PIM_HDATA 185.

If data is stored in the qTxQ 203 in the CCS 183 it is moved to the qDTEtxEPQ queue 204 when PIM_HDATA is called and the transmit operation is active (as distinguished from a PIM_HDATA receive call, as described below). Next, as indicated, the data is stored in the clnCompressBuffer 206, if data compression is enabled. If data compression is not enabled, the data is instead stored directly in the qTx-queue 211 within the data protocol stack 189, as described below.

If compression is enabled, the V42bis 184 module is called to encode the data as indicated by the encode logic block 208. The encoded data is then moved to the cOutCompressBuffer 209 and then stored in the cOutCompQ queue 210. Next as indicated, the data is sent to the data protocol stack 189.

Specifically, the data is first stored in the qTXqueue 211. From there the data frames are constructed by the ARQ error control protocol block 212 in accordance with the PDC protocol standards. Next the data is stored in the TxFrameBuffer 215.

The TCH data flow between the TxFrameBuffer 215 and the MPC 16 is interrupt driven. Accordingly, when the Transmit buffer 50 in the MPC 16 is ready to accept additional data, an interrupt is generated by the hardware. An interrupt service routine (not shown) in the HAD 154 is used to determine the cause of the interrupt (i.e. data or control, transmit or receive). Accordingly, in this example, the HAD 154 determines that the interrupt is caused by a data transmit ready condition (i.e. the FIFO 50 is ready to receive data). Thus, the HAD 154 moves the data from the TxFrameBuffer 215 into the QTxEPQ 222. From there, the data frame is buffered in the HAD 154 buffers, namely the HALTXBuffer 223 and the TX ISR Buffer 224, before being moved to the MPC 16 transmit FIFO 50.

The TX ISR Buffer is coupled with an interrupt service routine (ISR) within the HAD 154. As stated, the ISR (not shown) is used to determine the source of each interrupt so that the data is stored accordingly.

It is noted that in a preferred embodiment, the qTxEPQ 222 is at least 63 by 28 bytes in size. This size is required so that the queue 222 can hold at least 63 frames of data (at 28 bytes per frame) for supporting PDC error correcting routines that may require re-sending one or more of the past 62 data frames.

The data flow from the MPC 16 to the DTE 150 occurs as follows. First, an interrupt is generated when the Rx FIFO 52 receives data. This causes the HAD 154 to send the data fame through the Rx ISR Buffer 225 to the HALRxBuffer 224. Next, PIML_DATA is called and the data is moved to the qRxEPQ 221. From there, the data is stored in the RxFrameBuffer 220 within the data stack 189. The ARQ error control protocol block 212 operates on the data to remove the PDC header and frame information. This de-framed data is then stored in the qRXqueue 214.

Next, if data compression not enabled, the data is moved directly to the qDTErxEPQ 205. If data compression is enabled, V42bis 184 is called and the decode module 209 is used to decompress the data. The decompressed data is then stored in the cDeCompressBuffer 207. Next the data is stored in the qDTErxEPQ 205. The data remains there until the call control module 182 calls the PIM_HDATA module 185 to receive data. This typically occurs ones every 10 milliseconds. Once this function is called, the data frame is moved to the qRxQ 202 in the CCS 183 and sent to the RX Buffer 201 for receipt by the DTE 150.

Figure 12:
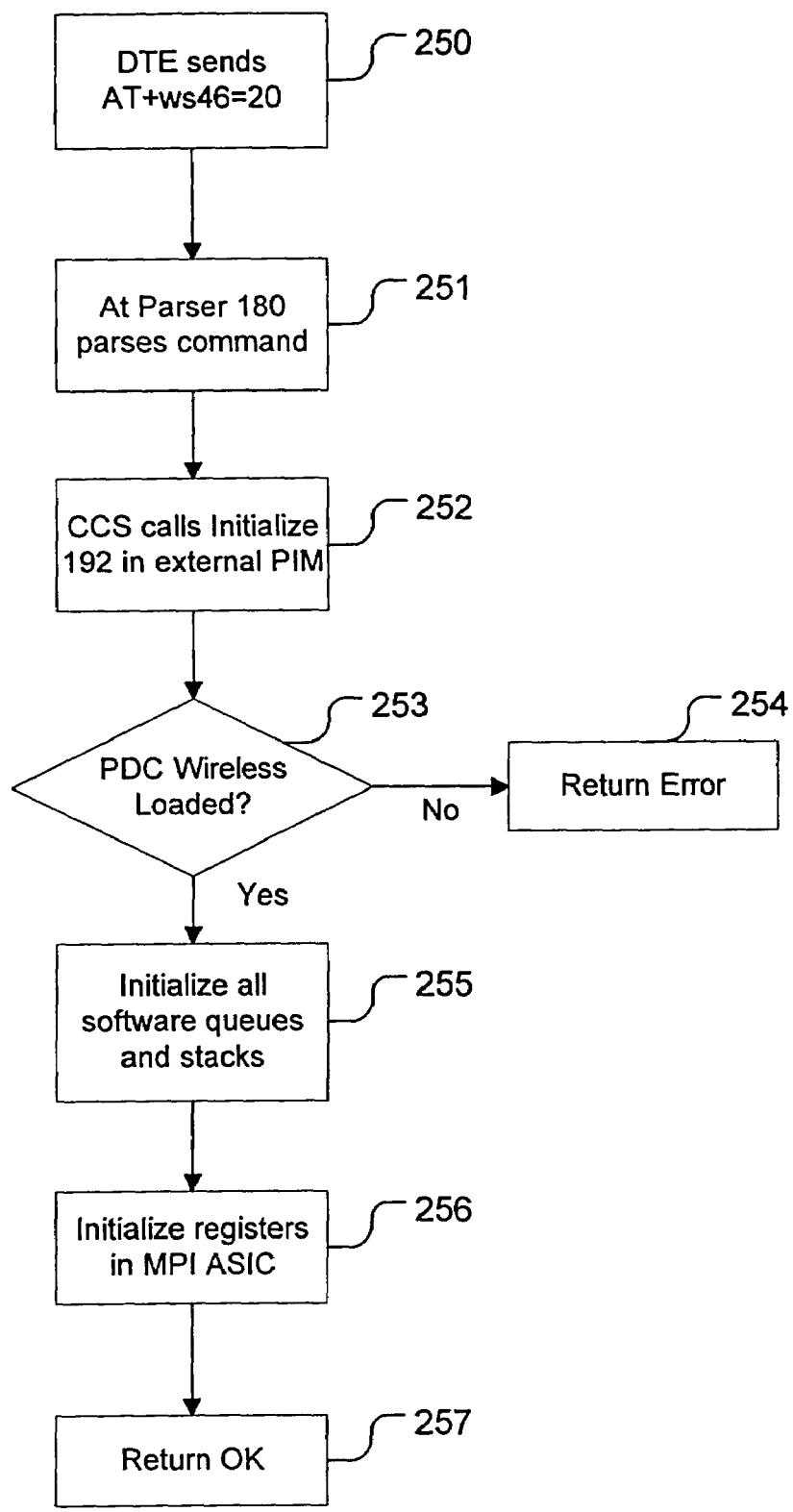
FIG. 12 is a flowchart depicting a process that can be used as an initialization routine in accordance with a preferred embodiment of the present invention.

FIG. 12 is a flowchart depicting a process that can be used to load the external PIM 174 and run the initialize routine 192 in the external PIM in accordance with a preferred embodiment of the present invention. The process begins with step 250 where the DTE 150 sends a predefined AT encoded message to indicate that PDC mode is now required. In this example, it is assumed that "AT+ws46=20" has been pre-defined to indicate that PDC mode should now be implemented to commence data communications through the cell phone 3.

This message is received by the CCS 183 and parsed by the AT parser 180, as indicated by step 251. Next, in step 252, the CCS 183 calls the initialize routine 192 in the PDC PIM 174. In step 253, the process determines if an error loading the PDC module 174 had occurred. If so, the process returns an error condition and ends, as indicated by step 254. If an error has not occurred and the PDC was loaded, then control continues with step 255, where the initialization routine 192 continues. Specifically, in step 255, the process initializes all software queues and stacks necessary for the data transfer operations, as described above. For example, memory allocation procedures and the like are performed for creating and reserving the data buffers and queues as described above with reference to FIG. 11.

Next, as indicated by step 256 all of the registers in the MPC ASIC 16 are set in accordance with the register tables described above. For example, the USART 64, the GPIOs 66, the TCH receiver/transmitter 62 and the timer generators 53 are all initialized with the appropriate values. The process ends, as indicated by step 257 and returns with a value to indicate that no errors had occurred.

FIGS. 13A and 13B are flowcharts depicting a process that can be used to send and receive control data in accordance with an embodiment of the present invention. The process begins with step 266 where the application program 150 sends a control command. In this example, a dial command is sent. Accordingly, the command is "ATDT-555-1212" is sent from the DTE 150. Next, as indicated by step 267, the AT parser 180 parses the command. In step 268 the call control module 182 calls the PIM_HCTL 185 with the dial command. Control next passes to step 269, where the control stack 186 formats the dial command by creating the necessary headers and frames required in accordance with the PDC protocol. This framed data is placed on the control stack 186. The data flow from this point on is interrupt driven and described in FIG. 13B.

Referring now to FIG. 13B, step 291 indicates the HAD 154 is notified of an interrupt request generated by the hardware in the MPC 16. An interrupt service routine in the HAD 154 determines the cause of the interrupt, which could be caused by a control or data channel, transmit or receive operation. In this example, it is assumed that the interrupt service routine has determined that the interrupt request is associated with the control path. Accordingly, step 292 determines whether the interrupt is associated with a transmit or receive operation.

For example, when the transmit control FIFO 58 is ready to receive data, it generates an interrupt. Similarly, when the receive control FIFO 60 receives data, it generates an interrupt. Thus, as indicated, if the interrupt from step 291 is associated with the control transmit path, step 293 is executed. In step 293 the HAD 154 calls the PIM_LCTL 187 to ask if any data is available. As indicated by step 294, if data is available, the PIM_LCTL 187 module moves the data from the control queue 186 to the HAD control buffer (not shown). If data is not available, the process ends as indicated by step 296.

If the interrupt from step 291 is associated with a control path receive operation, step 294 is executed. In step 294, the HAD 154 calls the PIM_LCTL 187 and the received data from the FIFO 60 is passed to the control stack 186. As indicated the process ends with step 296.

FIG. 14A is a flowchart depicting a process that can be used to implement a data channel transfer in accordance with a preferred embodiment of the present invention. The process begins with step 321, where a timer is reset (i.e. set to zero and programmed to begin counting). Next, in step 322, PIM_HDATA 188 is called with the "transmit" option enabled (see API description below). Next, as indicated by step 323, if data is available in the DTE queue (specifically, the qTxQ 203), it is moved to the qDTETxEPQ 204 in the external PIM 174, via the qTxQ 203 in the CCS 183.

In step 324, the process calls PIM_HDATA 188 again, but this time with "receive" mode enabled (see API description below). Next, in step 325, if any data is available in the external PIM queue (namely qTETrxEPQ 205), it is moved to the DTE's 150 receive buffer 201, via the CCS queue 202.

Next, as indicated by step 329, the timer is checked to determine if 10 milliseconds or more have elapsed since the last call to PIM_HDATA in step 322. In this example, the timer is used to assure that PIM_HDATA 188 is called every 10 milliseconds. As indicated, once this time period has elapsed, the process repeats itself by looping back to step 321. As described above, the low level flow of the communication data is interrupt driven. A flowchart depicting this process is described below with reference to FIG. 14B.

FIG. 14B is a flowchart depicting a process that can be used to implement the low level interrupt-driven communication flow in accordance with an embodiment of the present invention. The process begins with step 351, where the HAD 154 is notified of an interrupt request caused by the hardware in the MPC 16. An interrupt service routine in the HAD 154 determines the cause of the interrupt, which could be caused by a control or data channel, transmit or receive operation. In this example, it is assumed that the interrupt service routine has determined that the interrupt request is associated with the data path. Accordingly, step 352 determines whether the interrupt is associated with a transmit or receive operation.

For example, when the transmit data FIFO 50 is ready to receive data, it generates an interrupt. Similarly, when the receive data FIFO 52 receives data, it generates an interrupt. Thus, as indicated, if the interrupt from step 351 is associated with a transmit operation, step 354 is executed. In step 354 the HAD 154 calls the PIM_LDATA 190 to ask if any data is available. As indicated by step 355, if data is available, the PIM_LDATA 190 module moves the data from the data queue 189 to the HAD data buffer (specifically, HALTXBuffer 223). If data is not available, the process ends as indicated by step 357.

If the interrupt from step 351 is associated with a data receive operation, step 253 is next executed. In step 353, the HAD 154 calls the PIM_LDATA 190 and the received data from the FIFO 52 is moved to the data stack 189. As indicated the process ends with step 357.

The architecture of the present invention provides a set of interfaces that facilitate the development of external PIMs 171, such as PDC, that preferably use a standard modem interface. In the case of the external PIM 174 interface API for the PDC example implementation, the AT parser is split into two stacks (see 180 and 170 in FIG. 9). In this example, the first stack 180 is used to support a standard wired modem and the second AT parser 170 is used to support the MPI 16.

Using this approach, any effort to match function of both AT parsers 180 and 170 can be eliminated. COM port mode can be selected by issuing, for example, an "AT+WS46" command. A default mode for each COM port is preferably selected by setting a parameter in the Windows INF file.

Below are descriptions of the software architecture and a preferred method of access for the external PIM 174. Accordingly, the following describes entry points for the external PIM 174 stack including the interface between the external PIM 174 and the HAD 154. An example implementation of the command/status interface between the CCS 183 and the external PIM 174 is also included.

The external PIM 174 is preferably developed as a VxD, when the Windows 9x operating system is used. The protocol stack 171 is loaded and enabled by the CCS 183 when required. In this example embodiment, the external PIM 174 is implemented as a virtual device driver for Windows 9x. Knowledge of writing virtual device drivers is obtained from the Windows 95 or 98 DDK.

When the external PIM 174 is no longer needed it is preferably unloaded by the CCS 183 by calling the operating system function VXDLDR_UnloadDevice.

Details of the External PIM 174 Functions

Activation/Deactivation Functions

Preferably, the external PIM 174 provides at least the following functions:

EP_GetVersion: The first function in this table is EP_Get Version. It preferably returns the version of the external PIM 174.

EPInitialize: EPInitialize is an example of an initialize module 192 shown in FIG. 10. The module 192 establishes a new instance of the data and control data structure for the external PIM 174. It preferably returns a handle to be used by the CCS 183 on subsequent calls to the external PIM 174. It also gets the address of a callback function within the CCS 183. This address should be called by the external PIM 174 to signal status changes occuring within the external PIM 174

EPTerminate: EPTerminate is an example of a terminate module 191 shown in FIG. 10. The CCS 183 preferably calls the terminate module 191 to deactivate the external PIM 174. This function should be used by the external PIM 174 to free any allocated instance data. This message should also return the previously defined handle to the external PIM 174.

Data Movement Functions for the External PIM 174 Data

As shown in FIG. 10 the external PIM 174 preferably implements the following interfaces in accordance with preferred embodiment of the present invention.

1. Interface to the data flow coming from (and going to) the CCS 183 (PIM_HDATA 188).

2. Interface to the data flow coming from (and going to) the hardware (PIM_LDATA 190)

3. Interface to the control information from (and to) the CCS 183 (PIM_HCTL 185).

4. Interface to the control information from (and going to) the hardware (via the HAD 154) (PIM_LCTL 187)

PIM_HDATA Module 188: This module is preferably called regularly (based on timer or event) by the CCS 183 to send data to the external PIM 174 and to poll for data from the external PIM 174

PIM_LDATA Module 190: This module is preferably will be called regularly (based on hardware activity) by the HAD 154 when a predefined size of data is required or when a predefined size of data becomes available. The predefined size of data is 28 bytes in case of the PDC high speed example, and 32 Bytes in the case of the PDC Packet mode example.

PIM_HCTL Moudle 185: The CCS 183 calls PIM_HCTL 185 for specific control data.

PIM_LCTL Module 187: The CCS 183 calls PIM_LCTL 187 based on status changes Function Table Example In this example, when the external PIM 174 VxD is loaded, the following function table is exported to the CCS 183 code.

```
typedef struct tagEXTPROTO_FN_TABLE
{
    DWORD (*EP_GetVersion)( );
    DWORD (*EPInitialize)
        (WINAC_HANDLE PSYS,
        EPCALLBACK pfnCallback,
        DWORD DevNode,
        WORD Mode);
    DWORD (*EPTerminate)(EP_HANDLE hEP);
    BOOL (*PIM_HDATA)
        (EP_HANDLE hEP,
        BYTE eDir, \\To or From DTE
        BYTE far *pBuff,
        WORD *pwCount);
    Void (*PIM_LDATA)
        (EP_HANDLE hEP,
        BYTE eDir,
        BYTE *pBuff,
        WORD *pwCount,
        WAC_PIM_STATUS *peStatus);
    BOOL (*PIM_HCTL)
        (EP_HANDLE hEP,
        PDC_EVENT CmdType),
    Void (*PIM_LCTL)
        (EP_HANDLE hEP,
        BYTE eDir,
        BYTE *pBuff,
        WORD *pwCount,
        WAC_PIM_STATUS *peStatus)
} ExtProtocolFunctionTable;
typedef DWORD WINAC_HANDLE;
```

External Protocol Example Design Specification

The following section describes the interface between the CCS 183 and the external PIM 174.

To start a connection, the CCS 183 loads the external PIM 174 as a Virtual Device Driver (VxD). The CCS 883 first fetches the version number from the external PIM 174. If the version matches, the CCS 183 calls the external PIM 174 initialization routine 192. After a successful initialization, the CCS 183 and the external PIM 174 communicate with each other using the routines described in this section, for example. These routines consist of a series of calls from the CCS 183 to the external PIM 174, and one call from the external PIM 174 to the CCS 183.

When the CCS 183 calls the external PIM 174, it passes a handle that contains the current instance context for the external PIM 174. This is referred to herein as the "hEP". When the external PIM 174 calls the CCS 183, it passes a handle that contains the current instance context for the CCS 183. This handle is referred to herein as the "PSYS."

The CCS 183 creates one HANDLE each time the CCS 183 opens a new COM port. The PSYS identifies a data structure that holds all of the data for that instance of the CCS 183 driver. The external PIM 174 creates a hEP each time the CCS 183 initializes it. Preferably, the external PIM 174 use hEP in the same way that CCS 183 uses DP_HANDLE of PSYS structure, that is as a data structure to hold all of the data for a single wireless COM port.

PSYS is passed to allow the external PIM 174 to pass its status to the correct instance of the CCS 183 driver. Similarly, the hEP is passed to allow the code to handle more than one external PIM 174.

External PIM 174 Activation

EPInitialize (initialize the external PIM 174, called by the CCS 183 code)

This function will cause the external PIM 174 to instantiate and initialize itself to communicate with the CCS 183 code. During the initiate stage the CCS 183 code passes a callback pointer and instance context for this callback. This pointer is called by the external PIM 174 to signal status changes (HAD 154 status changes) or events happening within the external PIM 174. The instanced context is not used by the external PIM 174 but is simply passed back to the CCS 183 as a parameter within this call. The external PIM 174 instance context or "handle" (which is different to the CCS 183 code instance context) is returned by the EPInitialize function. This newly created instance context will be used in a similar manner by the controller code. This instance context will be passed as a parameter in all other CCS 183 controller code interface functions.

```
Inputs:
    Parm1: PSYS (contained the CCS 183 code instance context)
        (typedef DWORD WINAC_HANDLE)
    Parm2: Pointer to callback function pfnCallback (Status changes)
    typedef void * EPCALLBACK)(WINAC_HANDLE hWinAC,
            PDC_CALLBACK_EVENT event,
            DTE_Param *DTEParam,
            WORD Value)
    Parm3: The Device node within the windows registry so the external
    PIM 174 can store its own parameters and/or profile within the
    registry.
    Parm4: PDC mode. This parameter indicates which PDC mode is
    selected. The value passed is 20 if PDC high speed is selected and
    27 if PDC packet mode is selected.
```

Return:

EP_HANDLE (typedef DWORD EP_HANDLE) is the instance context return by the external PIM 174.

EP_HANDLE EPInitialize (WINAC_HANDLE PSYS, EPCALLBACK pfnCallback, DWORD DevNode, BOOL DefaultSwitch, WORD Mode);

Version Identification

EP_GetVersion ( ) (called by the CCS 183 code)

This function returns a version identification number. This is required for the CCS 183 to identify which version of the external PIM 174 specification has been implemented. The CCS 183 knows by checking the value return by EP_GetVersion if the function table was changed. The number returned is the version number of the protocol. The external PIM 174 returns a version number lower than one before production and higher than one after production. The DWORD returned by the external PIM 174 to CCS 183 should preferably follow the following format:

for example Hex 00000090 for version 0.9, Hex 00000100 for version 1.0 and 1.05 is Hex 00000105.

Return: DWORD EP_GetVersion ( )

Deactivate the External PIM 174

EPTerminate (destroy the communication channel with the external PIM 174. This function is called by the CCS 183 code)

This function should deactivate the external PIM 174 and close the communication channel with the CCS 183. The external PIM 174 instance context is returned to the CCS 183 code to inform it to close the external PIM 174 channel. After this call, the hEp handle is no longer valid. It is important to call this function when the external PIM 174 is no longer needed.

Input: Parm1: hEP is the external PIM 174 instance context returned by the EPInitialize function.

Return: None

Void EPTerminate (EP_HANDLE hEP);

Data Flow

PIM_HDATA is called to transmit and receive data to/from the application 150. PIM LDATA 188 is called regularly (based on hardware activity) by the CCS 183 when a frame of data is required or when a frame of data becomes available. The CCS 183 calls PIM_HDATA 188 twice every 10 ms, once for data going to the application 150 (TO_DTE) and once for data coming from the application 150(FROM_DTE). If all data in the buffer cannot be transferred at once, PIM_HDATA 188 is called continuously. The first call is to PIM_HDATA 188 with the FROM_DTE direction set, and the second call is to PIM_HDATA 188 call with TO_DTE direction set.

RX/TX Data to/from DTE

The CCS 188 calls the PIM_HDATA function to inform the external PIM 174 that data must be moved from the external PIM 174 buffer to the DTE buffer or that data must be moved from the DTE buffer to the external PIM 174 buffer. The direction parameter within the PIM_HDATA call will define the direction of the data movement.

The data moved from DTE to external PIM 174 or the data moved from the external PIM 174 to DTE will require the following parameters within the PIM_HDATA function call.

Inputs:

Parm1: handle to external PIM 174 returned by the EPInitialize function

Parm2: Direction, indicate in which direction the data is moving (DTE to external PIM 174 or external PIM 174 to DTE)

For instance:

FROM_DTE: The data will be moved from DTE to external PIM 174

TO_DTE: The data will be moved from the external PIM 174 to DTE.

Parm3: Pointer to the data buffer. Points to a data area in the driver data space that the PIM will use to read or write information specific to the PIM type (TO_DTE or FROM_DTE).

Parm4: The number of byte to be read by the external PIM 174 or the number of bytes written to the buffer when the call returns.

If the external PIM 174 cannot accept data (for example the external PIM 174 buffer is full), the call will return false. This return value will be used to handle the flow control between the DTE and the external PIM 174.

Return: True or False

Returns a Boolean corresponding to whether the PIM type (FROM_DTE and TO_DTE) specific operation should be considered a success by the driver, and mirrored to the caller in some cases. For example, in case of TO DTE if the buffer is empty, the return value will be False.

BOOL PIM_HDATA (EP_HANDLE hEP, BYTE eDir, BYTE far *pBuff, WORD *pwCount)

define FROM_DTE 2 define TO_DTE 3

To implement the data transfer function the modem driver registers the data transfer routines with the timer services provided by the driver. FromHostTxfr and ToHostTxfr are the registered routines and are called based on a timer referred to as "WINAC_WIRELESS_STARTUP_RESOLUTION."

The WINAC_WIRESLESS_STARTUP_RESOLUTION is typically set to 10 milliseconds. FromHostTxfr will call PIM_HDATA (FROM_DTE) upon any data event coming from the application. The following function call is an example:

```
osRegister(&ModemController,
    &FromHostTxfr,
    &ToHostTxfr,
    WINAC_STARTUP_RESOLUTION)
```

The FromHostTxfr routine will call PIM_HDATA 188 with the following information:

1. The direction (FROM_DTE)
2. The address of a linear input buffer
3. The number of bytes in this buffer.

The PIM_HDATA 188 (FROM_DTE) is typically called in every 10 ms.

The PIM_HDATA 188 (FROM_DTE) moves data, based on the room in its own internal buffer, from the linear data buffer to its own internal queue. The number of bytes actually transferred is assigned to the location pointed to by the variable pwCount passed in the call.

The ToHostTxfr routine will call PIM_HDATA 188 with the following information:

1. The direction (TO_DTE PIM)
2. The address of a linear output buffer
3. The number of bytes that it can take (default=1).

PIM_HDATA 188 (TO_DTE) moves data from its own internal queue to the linear output buffer. PIM_HDATA 188 also assigns the actual number of bytes written to the buffer in the pwCount variable. The number of bytes actually transferred during each call is one (pwCount=1). ToHostTxfr passed data one character by one character to PIM_HDATA.

Transmit/Receive Data to/from Hardware Access Driver

The hardware access driver (HAD 154) calls the PIM_LDATA function 190 to transmit data from the external PIM 174 to the HAD 154 or to send the data received from the MPC 16 to the external PIM 174. The direction parameter within the PIM_LDATA call defines the direction of the data transfer. This call also indicates whether a buffer has been transmitted from the HAD 154 or a buffer has been received from the HAD 154.

The HAD 154, based on the received buffer threshold, will generate an interrupt. Data received from the MPC 16 is passed to the external PIM 174 by the PIM_LDATA function call. The HAD 154, based on the transmit buffer threshold, will generate an interrupt. Data will be sent from the external PIM 174 to the HAD 154 by the PIM_LDATA function call.

The following parameters can be used when data is moved from or to the HAD 154:

Inputs:

Parm1: handle to external PIM 174 returned by the EPInitialize function

Parm2: Direction, indicate in which direction the data is moving (HAD 154 to external PIM 174 or external PIM 174 to HAD 154)

For example

FROM_HAD: The data will be moved from HAD 154 to external PIM 174

TO_HAD: The data will be moved from the external PIM 174 to HAD 154.

Parm3: Pointer to the data buffer. Points to a data area in the driver data space that the PIM will use to read or write data.

Parm4: When PIM_LDATA 190 is called with received data, this is the number of bytes in the buffer and returns with the number of bytes read from this buffer. When PIM_LDATA 190 is called to transmit data, this is the number of bytes requested and it returns the number of bytes written to the buffer. On the transmit side (TO_HAD) the default number of character requested during each PIM_LDATA call is one. If the number of character passed by PIM_LDATA (TO_HAD) is more than one character (default value), Pwcount should be modified (PwCount=number of character put on the buffer of transmit side)

Parm5: WAC_PIM_STATUS enumerates transmit and receive status and is shown below. NULL can be passed if this parameter is not used. Specific values for this field are located in the example code. Note that the External PIM will not generally use all the values.

Return:

Not required

Void PIM_LDATA (EP_HANDLE hEP, BYTE eDir, BYTE *pBuff
WORD *pwCount, WAC_PIM_STATUS *peStatus);
define FROM_HAD 0
define TO_HAD 1

Calls to PIM_LDATA 290 will be triggered by hardware events (e.g. when a frame is received).

FROM_HAD:

PIM_LDATA 190 will move data from the hardware receive buffer 52 to its own internal queue (based on availability) and will return the number of bytes actually moved. Again, the number of bytes moved will be assigned to the location pointed to by pwCount. It will also return the WAC_PIM_STATUS. PIM_LDATA 190 will set WAC_PIM_STATUS to HOSTTOHAL_BUFFER_FULL if the number of bytes moved from the HADRxBuffer to it own queue is less than the number of bytes provided by the HADRxBuffer. In the normal processing case the peStatus will return HOSTTOHAL_RX_OK. PIM_LDATA (FROM_HAD) is called only when the device receives data for the external PIM 174. The HAD 154 is generally data driven and not timer driven.

TO_HAD:

PIM_LDATA 190 will move the number of bytes (the default number of bytes is one, if more than one Byte need to be passed, Pwcount should be set with the new number of character put on the buffer) requested from the external PIM 174s to the hardware transmit buffer 50. If the internal queue does not have the requested amount of bytes, then PIM_LDATA 190 will a return a transmit buffer empty indication along with the number of bytes actually moved. In this case PIM_LDATA shall set WAC_PIM_SATTUS to HOSTTOHAL_BUFFER_EMPTY. By convention, the normal return value when the number of bytes requested is successfully transferred is ilt and maintained Control Flow The user (or application program 150) issues one of the AT commands specified below to select between the CCS 183 and one of the external PIM 174 data transfer modes. The default mode is typically the CCS 183 data transfer mode.

TABLE 11

Example of the AT command mode switch

| AT command | Description |
|---|---|
| AT + WS46 = 1 | Enable The CCS 183/HSF mode |
| AT + WS46 = 20 | Enable the PDC High Speed mode |
| AT + WS46 = 27 | Enable the PDC Packet mode |
| AT + WS46 = 12 | Enable the GSM mode |
| AT + WS46 = 7 | Enable the AMPS mode |
| AT + WS46 = <X> | Enable the X mode |

Once a connection is established, all the data will be passed to the external PIM 174.

Call Back Function

The external PIM 174 passes control information to the CCS 183 by calling the callback function, ExtProtoCallback, which was passed as a parameter in the EPInitialize call.

void ExtProtoCallback (WINAC_HANDLE hWinAC,
PDC_CALLBACK_EVENT event,
DTE_Param *DTEParam,
WORD Value), The following parameters are example requirements for the ExtProtoCallback:

Inputs:

Parm1: handle to CCS 183 received by the EPInitialize function

Parm2: The PDC callback events:

An example of the event is:

PDC_CALLBACK_CHRESET:

This callback function will be called when the external PIM 174 needs to reset the device. This function resets whole basic device including control serial channels 48 and TCH frame channels 46.

This function call can be used when the system is terminating calls and starting calls to clear and reset the TCH frame data buffers 50 and 52.

Parm3: The DTE parameters required by PDC external PIM 174

PDC_CALLBACK_REQUEST_DTE_PARAMETERS

This callback requests that the CCS 183 pass the current DTE port parameters to the external PIM 174. In this case a pointer is passed to a DTE_PARAMETER structure. The CCS 183 will fill this structure. The structure is defined as follows.

typedef struct DTE_Parameters_Struct DTE_Param;
struct DTE_Parameters_Struct{
  WORD Sizeof_DTE_Param;
  BYTE DTE_Speed; // see table below
  BYTE Char_length; // 1 for 7 bits, 0 for 8 bits
  BYTE Parity_ID; // NONE=0, EVEN=1, ODD=2
  BYTE Stop_Bits; // 1 stop bit=0, 2 stop bit=1
};

The following setting is an example requirement for the PDC example.

Sizeof_DTE_Param=Sizeof(DTE_Parameters_Struct)

TABLE 12

DTE_Speed value

| DTE_SPEED | Speed |
|---|---|
| 0 | 300 |
| 1 | 600 |

TABLE 12-continued

| DTE_Speed value | |
|---|---|
| DTE_SPEED | Speed |
| 2 | 1200 |
| 3 | 2400 |
| 4 | 4800 |
| 5 | 7200 |
| 6 | 9600 |
| 7 | 1200 |
| 8 | 14400 |
| 9 | 19200 |
| 10 | 38400 |
| 11 | 57600 |
| 12 | 115200 |

Parm 4: The default value will be zero when there is no Value to return.

Control Data from DTE to External PIM 174

The CCS 183, in calling the PIM_HCTL 185 function, will inform the external protocol about the control data such as DIAL, NASWER, ONHOOK etc . . . In addition, certain other signals are defined. The return message will be passed to CCS 183 through the call back function ExtProtoCallback.

The following parameters can be used when PIM_HCTL 185 is called:

Parm1: handle to external PIM 174 returned by the EPInitialize function

Parm2: Command types.

Parm3: Pointer to control parameters or string to be passed to the External PIM 174. CCS 183 passes NULL as parameter 3 if no parameter is needed.

Parm4: The number of bytes (control parameters) transferred between the CCS 183 code and the external PIM 174. CCS 183 passes NULL as parameter 3 if no parameter is needed.

Return:

True or False

BOOL PIM_HCTL_R (EP_HANDLE hEP, EP_EVENT eCmdType, BYTE *PBuff, BYTE *pWCount);

Two examples of commands:

EP_HCTL_DIAL

Dial the number passed by pwcount pointer.

EP_HCTL_ANSWER

Answer to the Call

Control Data from Hardware Access Driver to External PIM 174

The HAD 154 calls the PIM_LCTL function 187 to transfer status changes between the MPC 16 and the external PIM 174. The direction parameter within the PIM_LCTL call defines the direction of the transfer. PIM_LCTL (FROM_HAD 154) is called only when the device receives data for the external PIM 174. The HAD 154 is data driven.

The PIM_LCTL function call requires the following parameters.

Inputs:

Parm1: handle to external PIM 174 returned by the EPInitialize function

Parm2: Direction, indicates in which direction the data is moving (HAD to external PIM 174 or external PIM 174 to HAD)

For example:

FROM_HAD: The data will be moved from HAD to external PIM 174.

TO_HAD: The data will be moved from the external PIM 174 to HAD.

Parm3: Pointer to the data buffer. Points to a data area in the driver data space that the PIM will use to read or write data.

Parm4: When PIM_LCTL 187 is called with received data, this parameter points to the number of bytes in the buffer and returns with the location filled with the number of bytes read from this buffer. When PIM_LCTL 187 is called to transmit data, this is the number of bytes requested and the numbers of bytes actually transferred is place in the location pointed to by pwCount by PIM_LCTL. In transmit side (TO_HAD) the default number of character requested during each PIM_LCTL call is one. If the number of character passed by PIM_LCTL (TO_HAD) is more than one character (default value), Pwcount should be modified (PwCount=number of character put on the buffer of transmit side).

Parm5: WAC_PIM_STATUS enumerates transmit and receive status and has semantics analogous to PIM_L-DATA.

Return:

Not required

Void PIM_LCTL (EP_HANDLE hEP, BYTE eDir, BYTE *pBuff,

WORD *pwCount, WAC_PIM STATUS *peStatus);

define FROM_HAD 0 define TO_HAD 1

Flow Control

The application 150 will stop sending data when the host queue is full. The CCS 183 handles the XON/XOFF flags. The external PIM 174 does not need to process any XON/XOFF flags. Because the CCS 183 stack has the knowledge of the local configuration, it will process either XON/XOFF or RTS/CTS flow control transparently.

The CCS 183 code sets XOFF and XON thresholds arbitrarily. These thresholds are determined by the application buffer size given to the CCS 183. The XOFF threshold is set at 80% of its buffer size. The XON threshold is typically set at 40% of its buffer size.

The XOFF char will be sent to the application 150 if the TX buffer level is at or above the high water mark. The XON char will be sent to the application if TX buffer level is at or below the low water mark.

The CCS 183 code will send XOFF to the DTE and/or drops CTS, if the local hardware flow control is enabled, when transmit buffer queue reaches the XOFF threshold.

The CCS 183 will send XON to the DTE and/or raise CTS, if the local hardware flow control is enabled, when transmit buffer queue reaches the XON threshold (40% of the buffer size).

The user can typically switch between the software flow control and the hardware flow control with an appropriate AT command.

Ladder Tables

The following ladder tables are useful for describing example sequences of events that can be used to implement a typical embodiment of the present invention. The following ladder tables depict an example of sequenced events that can occur within the DTE 150, the CCS 183 and the external PIM 174 modules.

Calling Sequence

TABLE 14

Example of External Protocol (PDC) messages
(Dialing mode and switching mode)

| Step | DTE 150 | CCS 183 | External PIM 174 |
|---|---|---|---|
| 1 | AT + WS46 = n<CR>→ | | |
| 2 | | EP_GetVersion( )→ | |
| 3 | | Load PDC<br>EPInitialize (PSYS, PFnCb,n)→ | Initialize stack |
| 4 | | Instance context =hEP | Return External protocol<br>← instance context |
| 5 | | Init HAD | |
| 6 | OK ← | | |
| 7 | ATDTxxxx<CR>→ | | |
| 9 | | Parse commandCall<br>PIM_HCTL(hEP, "DIAL", <xxxx>,4) | |
| 9 | | HAD call<br>PIM_LCTL(hEP, 0, <CtlData>,<br>n, NULL)→ | Get the Ctl Data |
| 10 | | | ←<br>ExtProtoCallback(hWinAC,<br>CARRIER, NULL, 9600) |
| 11 | | | |
| 12 | CARRIER 9600← | | |
| 13 | | Data phase DTE interface<br>PIM_HEX(hEP, 0, <data>, n, 1)→ | Read data / Return Data |
| 14 | | Data phase PHONE interface<br>PIM_LEX(hEP, 1, <data>, n, 1)→ | Read data / Return Data |

TABLE 15

Example of External Protocol (PDC) messages (No Dial Tone mode)

| Step | DTE 150 | CCS 183 | External PIM |
|---|---|---|---|
| 1 | AT + WS46 = n<CR>→ | | |
| 2 | | EP_GetVersion( )→ | |
| 3 | | Load PDC<br>EPInitialize (PSYS, PFnCb, n)→ | Initialize stack |
| 4 | | Instance context = hEP | Return External protocol<br>← instance context |
| 5 | | Init HAD | |
| 6 | OK ← | | Set the protocol mode |
| 7 | ATDTxxxx<CR>→ | | |
| 8 | | Parse command<br>Call<br>PIM_HCTL(hEP, "DIAL", <xxxx>4)→ | |
| 9 | | HAD call<br>PIM_LCTL(hEP, 0, <CtlData>, n,<br>NULL)→ | Get the Ctl Data |
| 10 | | | ←<br>ExtProtoCallback(hWin<br>AC, NO_DIAL_TONE,<br>NULL, NULL) |
| 11 | NO DIAL TONE ← | | |

Answering Sequence

TABLE 17

Example of External Protocol (PDC) messages (Answering data mode)

| Step | DTE 150 | CCS 183 | External PIM 174 |
|---|---|---|---|
| 1 | AT + WS46 = n<CR>→ | | |
| 2 | | EP_GetVersion( )→ | |
| 3 | | Load PDC<br>EPInitialize (PSYS, PFnCb)→ | Initialize stack |
| 4 | | Instance context = hEP | Return External protocol<br>← instance context |
| 5 | | Init HAD | |

TABLE 17-continued

Example of External Protocol (PDC) messages (Answering data mode)

| Step | DTE 150 | CCS 183 | External PIM 174 |
|---|---|---|---|
| 6 | OK ← | | Set the protocol mode |
| 7 | | HAD call PIM_LCTL(hEP, 0, <Ctl Date>, n, NULL)→ | |
| 8 | | | Decode the "Ctl Data" <br> ← <br> ExtProtoCallback(hWin AC, RING, NULL, NULL) |
| 9 | RING ← | | |
| 10 | ATA<CR>→ | | |
| 11 | | Call PIM_HCTL (hEP, 3, NULL, NULL)→ | |
| 12 | | HAD call PIM_LCTL(hEP, 0, <CtlData>, n, NULL)→ | Get the Ctl Data |
| 13 | | | ← <br> ExtProtoCallback(hWin AC, CARRIER, NULL, 9600) |
| 14 | CARRIER 9600 ← | | |
| 15 | | Data phase DTE interface Call PIM_HEX(hEP, 0, <data>, n, 1) | Read data / Return Data |
| 16 | | Data phase PHONE interface Call PIM_LEX(hEP, 1, <data>, n, 1) | Read data / Return Data |

TABLE 19

Port close in CCS mode

| Step | DTE 150 | CCS 183 | External PIM 174 |
|---|---|---|---|
| 1 | AT + WS46 = 20<CR>→ | | |
| 2 | | Load PDC VxD | |
| 3 | | EP_GetVersion( )→ <br> EPInitialize (PSYS, PFnCb, 20)→ | Initialize stack |
| 4 | | Instance context = hEP | Return External protocol <br> ← instance context |
| 5 | | Init HAD | |
| 6 | OK ← | | Set the protocol mode |
| 7 | AT + WS46 = 1<CR>→ | | |
| 8 | | Terminate PDC | |
| 9 | OK | | |

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A computer software product for use by a computer system to transfer data between said computer system and a mobile phone for communication with a wireless network, said wireless network using a communication protocol, wherein said computer system is connected to a first end of a cable and said mobile phone is connected to a second end of said cable, said computer software product comprising:
   code for formatting said data in accordance with said communication protocol to generate formatted data; and
   code for transmitting said formatted data over said cable;
   wherein said cable includes a mobile phone interface interposed on said cable between said first end and said second end, and wherein said mobile phone interface has an interface engine in communication with said computer system, a digital translation block in communication with said interface engine, and a phone interface in communication with said mobile phone.

2. The computer software product of claim 1, wherein said code for formatting converts said data between a format used by a data terminal emulation program and another format used by said communication protocol.

3. The computer software product of claim 1 further comprising code for parsing commands, code for controlling a hardware access drive, and code for an external plug-in module.

4. A method of transferring data for use by a computer system to transfer data between said computer system and a mobile phone for communication with a wireless network, said wireless network using a communication protocol, wherein said computer system is connected to a first end of a cable and said mobile phone is connected to a second end of said cable, said method comprising:

formatting said data in accordance with said communication protocol to generate formatted data; and transmitting said formatted data over said cable;

wherein said cable includes a mobile phone interface interposed on said cable between said first end and said second end, and wherein said mobile phone interface has an interface engine in communication with said computer system, a digital translation block in communication with said interface engine, and a phone interface in communication with said mobile phone.

5. The method of claim 4, wherein said formatting converts said data between a format used by a data terminal emulation program and another format used by said communication protocol.

6. A computer system capable of communicating data with a mobile phone for communication with a wireless network, said wireless network using a communication protocol, wherein said computer system is connected to a first end of a cable and said mobile phone is connected to a second end of said cable, said computer system comprising:

a formatting module configured to format said data in accordance with said communication protocol and to generate formatted data; and a transmitting module configured to transmit said formatted data over said cable;

wherein said cable includes a mobile phone interface interposed on said cable between said first end and said second end, and wherein said mobile phone interface has an interface engine in communication with said computer system, a digital translation block in communication with said interface engine, and a phone interface in communication with said mobile phone.

7. The computer system of claim 6, wherein said formatting module converts said data between a format used by a data terminal emulation program and another format used by said communication protocol.

8. The computer system of claim 6 further comprising a command parser, a hardware access drive, and an external plug-in module.

9. A system for connecting a mobile phone to a computing device, said system comprising:

a computing device connector configured to connect to said computing device;

a mobile phone connector configured to connect to said mobile phone; and a mobile phone interface connecting said computing device connector to said mobile phone connector, said mobile phone interface including:

an interface engine in communication with said computing device connector;

a digital translation block in communication with said interface engine; and a phone interface in communication with said mobile phone connector;

wherein said computing device connector and said mobile phone connector are at two ends of a cable, and wherein said mobile phone interface is interposed on said cable between said two ends.

10. The system of claim 9 further comprising: a software program for controlling said mobile phone interface.

11. The system of claim 10, wherein said software program runs on said computing device.

12. The system of claim 10, wherein said software program converts data between a format used by said computing device and another format used by said mobile phone.

13. The system of claim 9, wherein said computing device connector is a Universal Serial Bus connector.

14. The system of claim 9, wherein said computing device is a personal computer.

15. A cable for connecting a mobile phone to a computing device, said cable comprising:

a first end configured to connect to said computing device;

a second end configured to connect to said mobile phone; and a mobile phone interface interposed on said cable between said first end and said second end, said mobile phone interface including:

an interface engine in communication with said computing device connector;

a digital translation block in communication with said interface engine; and a phone interface in communication with said mobile phone connector.

16. The method of claim 15, wherein said first end is a Universal Serial Bus connector.

17. The method of claim 15, wherein said computing device is a personal computer.

* * * * *